US008804858B2

(12) United States Patent
Chockalingam et al.

(10) Patent No.: US 8,804,858 B2
(45) Date of Patent: *Aug. 12, 2014

(54) TECHNIQUES FOR DECODING TRANSMITTED SIGNALS USING REACTIVE TABOO SEARCHES (RTS)

(71) Applicant: Indian Institute of Science, Karnataka (IN)

(72) Inventors: Ananthanarayanan Chockalingam, Karnataka (IN); Balaji Sundar Rajan, Karnataka (IN); Srinidhi Nagaraja, Karnataka (IN); Saif Khan Mohammed, Karnataka (IN)

(73) Assignee: Indian Institute of Science, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,775

(22) Filed: Jul. 2, 2013

(65) Prior Publication Data

US 2013/0315356 A1 Nov. 28, 2013

Related U.S. Application Data

(63) Continuation of application No. 12/771,730, filed on Apr. 30, 2010, now Pat. No. 8,503,544.

(51) Int. Cl.
*H04L 27/00* (2006.01)

(52) U.S. Cl.
USPC ............................ 375/259; 375/224; 375/340

(58) Field of Classification Search
USPC ........................ 375/224, 259–260, 316, 340
See application file for complete search history.

(56) References Cited

U.S. PATENT DOCUMENTS

| 5,255,210 | A | * | 10/1993 | Gardner et al. | ............... 702/196 |
| 5,911,011 | A | | 6/1999 | Henry | |
| 6,009,123 | A | * | 12/1999 | Kaku et al. | ..................... 375/265 |
| 7,342,970 | B2 | | 3/2008 | Liu | |
| 8,014,470 | B2 | | 9/2011 | Lee et al. | |
| 8,509,331 | B2 | * | 8/2013 | Bouzegzi et al. | ............. 375/260 |
| 2005/0162285 | A1 | * | 7/2005 | Melanson | ........................ 341/50 |

(Continued)

FOREIGN PATENT DOCUMENTS

WO WO2010029172 * 3/2010

OTHER PUBLICATIONS

I. E. Telatar, "Capacity of multi-antenna Gaussian channels," European Trans. Telecommun., vol. 10, No. 6, pp. 585-595, Nov. 1999.

(Continued)

*Primary Examiner* — Jean B Corrielus
(74) *Attorney, Agent, or Firm* — Brundidge & Stanger, P.C.

(57) ABSTRACT

Techniques for enabling an estimate of a transmittal signal vector, given a received signal vector and a channel matrix to be computed, are provided. An initial solution signal vector for the estimate is calculated, and based on the initial estimate, a pool of possible solutions is generated. Methods described herein may be iterative in nature, and may cycle through possible estimates of the transmitted signal vector so as to continually improve the estimates and the pool of possible estimates. The methods may terminate once stopping criteria are reached. In some example methods, solutions may be marked at taboo and a taboo period can be established that indicates a number of subsequent iterations for which the current solution signal vector cannot be considered.

24 Claims, 10 Drawing Sheets

(56) References Cited

U.S. PATENT DOCUMENTS

| | | | |
|---|---|---|---|
| 2006/0291595 A1* | 12/2006 | Bachu et al. | 375/346 |
| 2008/0198941 A1 | 8/2008 | Song et al. | |
| 2009/0074097 A1 | 3/2009 | Sadowsky | |
| 2010/0074342 A1 | 3/2010 | Shental et al. | |
| 2010/0150274 A1 | 6/2010 | Dai et al. | |
| 2011/0182336 A1 | 7/2011 | Chin et al. | |

OTHER PUBLICATIONS

F. Glover, "Tabu Search—Part 1," ORSA Jl. of Computing, vol. 1, No. 3, Summer 1989, pp. 190-206.

F. Glover, "Tabu Search—Part II," ORSA Jl. of Computing, vol. 2, No. 1, Winter 1990, pp. 4-32.

R. Ballili, G. Tecchiolli, "The reactive tabu search," ORSA Jl. on Computing, No. 2, pp. 126-140, 1994.

Y. Huang and J. A. Ritcey, "Improved 16-QAM constellation labeling for BI-STCM-10 with the Alamouti scheme," IEEE Commun. Letters, vol. 9, No. 2, pp. 157-159, Feb. 2005.

P. H. Tan and L. K. Rasmussen, "Multiuser detection in COMA—A comparison of relaxations, exact, and heuristic search methods," IEEE Trans. Wireless Commun., vol. 3, pp. 1802-1809, Sep. 2004.

H. Zhao, H. Long, W. Wang, "Tabu search detection for MIMO systems," PIMRC'2007, Sep. 2007.

L. G. Barbero and J. S. Thompson, "Fixing the complexity of the sphere decoder for MIMO detection," IEEE Trans. Wireless Commun., vol. 7, No. 6, pp. 2131-2142, Jun. 2008.

Y. Wang and K. Roy, "A new reduced complexity sphere decoder with true lattice boundary awareness for multi-antenna systems," IEEE ISCAS'2005, vol. 5, pp. 4963-4966, May 2005.

B. A. Sethuraman, B. Sundar Rajan, V. Shashidhar, "Full-diversity high-rate space-lime block codes from division algebras," IEEE Trans. Inform. Theory, vol. 49, No. 10, pp. 2596-2616, Oct. 2003.

F. Oggier, J.-C. Belfiore, and E. Viterbo, Cyclic Division Algebras: A Tool for Space-Time Coding, Foundations and Trends in Commun. and Inform. Theory, vol. 4, No. 1, pp. 1-95, Now Publishers, 2007.

J.-C. Belfiore, G. Rekaya, and E. Viterbo, "The golden code: A 2×2 full-rate space-lime code with non-vanishing determinants," IEEE Trans. Inform. Theory, vol. 51, No. 4, Apr. 2005.

A. F. Molisch, J. R. Foerster, M. Pendergrass, "Channel models for ultrawideband personal area networks," IEEE Wireless Commun., vol. 10, No. 6, pp. 1421, Dec. 2003.

A. F. Molisch, "Uitrawideband propagation channels—Theory, measurement, and modeling," IEEE Trans. Veh. Tech., vol. 54, No. 5, pp. 1528-1545, Sep. 2005.

J. Karedal, S. Wyne, P. Almers, F. Tufvesson, and A. F. Molisch, "Statistical analysis of the UWB channel in an industrial environment," Proc. IEEE VTC'2004—Fall, pp. 81-85, Sep. 2004.

R. Saadane and A. Menouni Hayar, "DRB1.3 third report on UWB channel models," NewCom, http://www.eurecom.fr/util/publidownload.fr.htm?id=2112, Nov. 2006.

Y. Sun, "A family of linear complexity likelihood ascent search detectors for COMA multiuser detection," Proc. IEEE 6thInti. Symp. on Spread Spectrum Tech. & App., Sep. 2000.

K. Vishnu Vardhan, SailK. Mohammed, A. Chockalingam, and B. Sundar Rajan, "A low-complexity detector for large MIMO systems and multicarrier COMA systems," IEEE JSAC Spl. Iss. on Multiuser Detection for Adv. Commun. Systems and Networks, vol. 26, No. 3, pp. 473-485, Apr. 2008.

SailK. Mohammed, Ahmed Zaki, A. Chockalingam, and B. Sundar Rajan, "High-rate space-lime coded large-MIMO systems: Low-complexity detection and channel estimation," to appear in IEEE Jl. Sel. Topics in Signal Processing (JSTSP): Spl. Iss. on Managing Complexity in Multiuser MIMO Systems, Dec. 2009. Online arXiv:0809.2446v3 [cs.IT] Sep. 16, 2009.

D. Shiu, G. J. Foschini, M. J. Gans, and J. M. Khan, "Fading correlation and its effect on the capacity of multi-antenna systems," IEEE Trans. on Commun., vol. 48, pp. 502-513, Mar. 2000.

D. Gesbert, H. B""olcskei, D. A. Gore, and A. J. Paulraj, "Outdoor MIMO wireless channels: Models and performance prediction," IEEE Trans. on Commun., vol. 50, pp. 1926-1934, Dec. 2002.

H. Taoka and K. Higuchi, "Field experiment on 5-Gbil/s ultra-high-speed packet transmission using MIMO multiplexing in broadband packet radio access," NIT DaCoMa Tech. Journ., vol. 9, No. 2, pp. 25-31, Sep. 2007.

Gregory Breit et al. 802.11ac Channel Modeling. doc. IEEE 802.11-09/0088r0, submission to Task Group TGac, Jan. 19, 2009.

J. Koivunen, Characterisation of MIMO Propagation Channel in Multi-link Scenarios, MS Thesis, Helsinki University of Technology, Dec. 2007.

SailK. Mohammed, A. Chockalingam, and B. Sundar Rajan, "A low-complexity near-ML performance achieving algorithm for large MIMO detection," Proc. IEEE ISIT'2008, Toronto, Jul. 2008.

SailK. Mohammed, A. Chockalingam, and B. Sundar Rajan, "High-rate space-lime coded large MIMO systems: Low-complexity detection and performance," Proc. IEEE GLOBECOM'2008, Dec. 2008.

Abrao et al., "S/MIMO MC-CDMA Heuristic Multiuser Detectors Based on Single-Objective Optimization," in Wireless Personal Communication, dated Apr. 15, 2009.

Srinidhi. N. et al. , "Low-Complexity Near-ML Decoding of Large Non-Orthogonal STBCs using Reactive Tabu Search," IEEE International Symposium on Information Theory (ISIT 2009), Seoul, pp. 4, Jun. 28-Jul. 3, 2009.

"Ruckus Wireless Wi-Fi Perfected," accessed at http://web.archive.org/web/20090218083729/http://www.ruckuswireless.com/technology/beamflex.php, accessed on Apr. 23, 2014, pp. 1-3.

"MIMO (multiple-input multiple-output)," Network World, accessed at http://web.archive.org/web/20090309102356/http://networkworld.com/community/node/20370, Oct. 8, 2007, pp. 1-3.

* cited by examiner

TECHNIQUES FOR DECODING TRANSMITTED SIGNALS USING REACTIVE TABOO SEARCHES (RTS)

CROSS REFERENCE TO RELATED APPLICATION

The present application is a Continuation application of U.S. application Ser. No. 12/771,730, filed on Apr. 30, 2010, now U.S. Pat. No. 8,503,544, which is incorporated herein by reference.

BACKGROUND

In conventional wireless communications, a single antenna is used at a source to wirelessly transmit a signal to a single antenna at a destination. In some cases, this gives rise to problems due to multipath effects. For example, when a wireless signal (an electromagnetic field) is met with obstructions such as hills, canyons, buildings, and utility wires, wavefronts can become scattered, and thus, may take many paths to reach the destination. Late arrival of scattered portions of the wireless signal can cause problems such as fading, cut-out, and intermittent reception.

Multiple input, multiple output (MIMO) is an antenna technology for wireless communications in which multiple antennas are used at both the source (transmitter) and the destination (receiver). Signals received at the multiple antennas at the source and at the destination are combined to minimize errors and optimize data speed. MIMO is one of several forms of smart antenna technology. Other forms include multiple input, single output (MISO) and single input, multiple output (SIMO), for example. Using smart antenna technology (e.g., multiple antennas at both the source and the destination) can eliminate signal problems caused by multipath wave propagation, and can even take advantage of this effect.

A space-time code (STC) is a method employed to improve reliability of data transmission in wireless communication systems using multiple transmit antennas. STCs rely on wirelessly transmitting multiple, redundant copies of a data stream to a receiver with the hope that at least some of the transmitted data streams may survive a physical path (e.g., wireless communication channel) between transmitting antennas and receiving antennas in a good enough state to allow for reliable decoding. Space-time block codes (STBCs) act on a block of data at once and may provide diversity gain.

MIMO systems that use large dimensional non-orthogonal STBCs may provide advantages over vertical Bell-labs layered space time (V-BLAST) type MIMO systems in that higher spectral efficiency (e.g., information rate that can be transmitted over a given bandwidth in a communication system) as well as full transmit diversity (e.g., transmitting multiple redundant copies of signals) may be provided. In addition to creating dimensionality in space, non-orthogonal STBCs from cyclic division algebras (CDA) can create large dimensionality using a combination of space and time. However, decoding received signals transmitted by such systems using sphere decoding or maximum a posteriori/maximum likelihood (MAP/ML) based methods may be prohibitively expensive.

SUMMARY

In one aspect, a method of determining an estimate of a signal received through wireless transmission is described. The method includes receiving a signal vector via a wireless communication channel, computing an estimate of a transmitted signal vector, and marking the estimate as a current solution signal vector. The method also includes, based on the estimate of the transmitted signal vector, determining a set of neighborhood signal vectors that include symbols selected based on distance from symbols in the estimate of the transmitted signal vector. The method further includes for each signal vector in the set of neighborhood signal vectors, determining an objective cost function value using the received signal vector, selecting a signal vector in the set of neighborhood signal vectors having a lowest objective cost function value and marking the selected signal vector as the current solution signal vector. The method also includes determining whether the current solution signal vector satisfies predetermined requirements, and based on the determination, determining that the current solution signal vector approximates the transmitted signal vector.

In another aspect, a computer readable medium having stored therein instructions executable by a computing device to cause the computing device to perform functions is described. The functions include receiving a signal vector via a wireless communication channel, computing an estimate of a transmitted signal vector and marking the estimate as a current solution signal vector, and based on the estimate of the transmitted signal vector, determining a set of neighborhood signal vectors that include symbols selected based on distance from symbols in the estimate of the transmitted signal vector. The functions also include for each signal vector in the set of neighborhood signal vectors, determining an objective cost function value using the received signal vector, and selecting a signal vector in the set of neighborhood signal vectors having a lowest objective cost function value and marking the selected signal vector as the current solution signal vector. The functions further include determining whether the current solution signal vector satisfies predetermined requirements, and based on the determination, determining that the current solution signal vector approximates the transmitted signal vector.

In still another aspect, a system is described that includes a processor, a data storage medium, and machine language instructions stored on the data storage medium and executable by the processor to perform functions. The functions include receiving a signal vector via a wireless communication channel, computing an estimate of a transmitted signal vector and marking the estimate as a current solution signal vector, and based on the estimate of the transmitted signal vector, determining a set of neighborhood signal vectors that include symbols selected based on distance from symbols in the estimate of the transmitted signal vector. The functions also include for each signal vector in the set of neighborhood signal vectors, determining an objective cost function value using the received signal vector, and selecting a signal vector in the set of neighborhood signal vectors having a lowest objective cost function value and marking the selected signal vector as the current solution signal vector. The functions further include determining whether the current solution signal vector satisfies predetermined requirements, and based on the determination, determining that the current solution signal vector approximates the transmitted signal vector.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
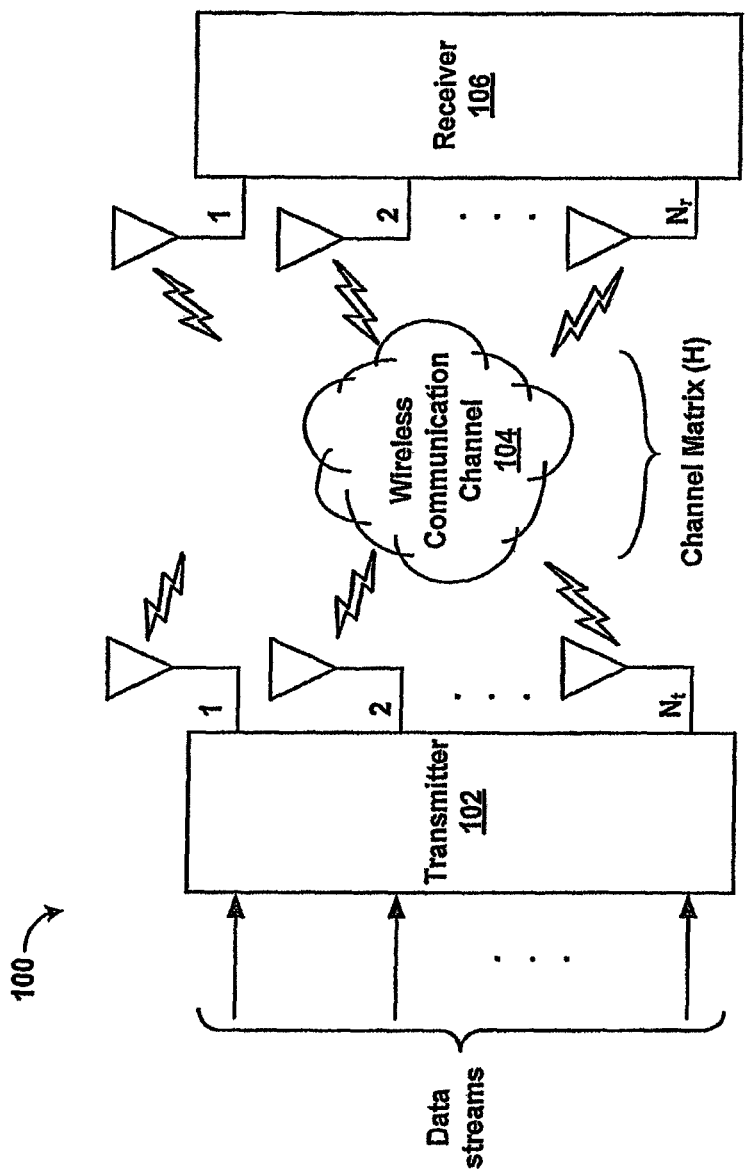
FIG. 1 shows an illustrative embodiment of a wireless communication system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Large-dimension communication systems may be used in wireless communications, where dimensions can be in space, time, frequency or their combinations. Use of a large number of transmit/receive antennas increases the number of spatial dimensions, which results in increased capacity. In embodiments described herein, decoding of signals received by MIMO systems that use non-orthogonal Space Time Block codes (STBC) is performed using a Reactive Taboo Search algorithm (RTS).

Taboo search (TS) is a heuristic designed to obtain approximate solutions to combinatorial optimization problems. In embodiments herein, a reactive taboo search method is described for decoding non-orthogonal STBCs from cyclic division algebras (CDA) to determine approximate maximum-likelihood (ML) solutions in linear vector channels (LVC). Using example embodiments, estimates of transmitted symbols (or transmitted signal vectors) in a system using non-orthogonal STBCs can be determined. Examples are described using the taboo search method in a large-MIMO system with tens of transmit/receive antennas, and in a delay-spread MIMO ultra wideband (UWB) system with tens to hundreds of multipath components. However, the taboo search method may be applied to other systems as well.

Referring now to FIG. 1, an illustrative embodiment of a wireless communication system 100 is illustrated. As depicted, a transmitter 102 may wirelessly transmit a data stream using a number of antennas $(1, 2, \ldots, N_t)$ through a wireless communication channel 104 (e.g., modeled by a channel matrix (H)) for receipt by a receiver 106 using a number of antennas $(1, 2, \ldots, N_r)$. The system 100 may be referred to as a MIMO system.

The wireless communication channel 104 can be described by a channel matrix H. The transmitter 102 and/or the receiver 106 can use the channel matrix H to determine beamforming coefficients (beamforming/steering vectors) that may be used to steer a transmission beam of the antennas $1, 2, \ldots, N_t$ to achieve higher throughput, for example. Thus, in one example, the channel matrix H may be used as an accurate estimate of the communication channel. In another example, the channel matrix H may be used to obtain an estimate of the communication channel.

The wireless communication system 100 may be modeled using linear vector channels where a $d_t$-dimensional input vector $x \in A^{d_t}$ (e.g., A denotes a finite set from the complex field) is linearly transformed by a $d_r \times d_t$ channel transfer matrix, $H \in C^{d_r \times d_t}$ and is corrupted by a $d_r$-dimensional noise vector, $n \in C^{d_r}$, so that the $d_r$-dimensional output vector, $y \in C^{d_r}$, is given by:

$$y = Hx + n \quad \text{Equation (1)}$$

where x is a transmitted signal vector, y is a received signal vector, and n is a noise signal vector. Within embodiments described below, an estimate of the transmitted signal vector x is determined, given y and knowledge of H and statistics of n.

Figure 2:
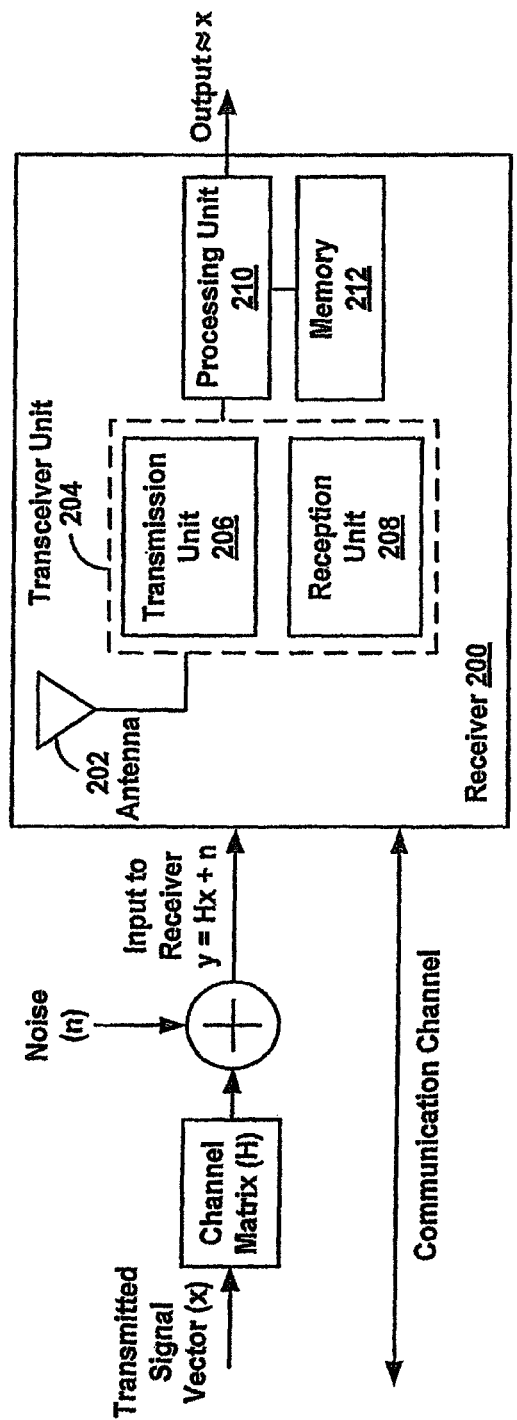
FIG. 2 shows an illustrative embodiment of a conceptual signal transmission diagram.

FIG. 2 shows an illustrative embodiment of a conceptual signal transmission diagram. As depicted, a transmitted signal vector (x) is sent to a receiver 200 via a communication channel that may be described or modeled by a channel matrix (H). A signal vector received at an antenna 202 of the receiver 200 is (y=Hx+n), where y is an $(N_r \times 1)$ received signal vector and $N_t$ is a number of transmitting antennas, H is the channel matrix, vector $x = [x_1, x_2, \ldots, x_{N_s}]^T$ is an $(N_s \times 1)$ vector of transmitted symbols, $N_s$ is a number of receive antennas, and n is an $(N_r \times 1)$ noise vector. Although only one receive antenna 202 is depicted in the receiver 200 of FIG. 2, more receive antennas may be included in the receiver 200. The channel matrix H is an $(N_r \times N_s)$ matrix of channel coefficients that include complex fading coefficients between transmit antennas and receive antennas, for example.

A transceiver unit 204 including a transmission unit 206 and a reception unit 208 receives the signal vector (y=Hx+n) from the antenna 202 and passes the signal vector (y=Hx+n) to a processing unit 210. The processing unit 210 is coupled to memory 212, and executes applications to determine an estimate or approximate of the transmitted signal vector (x).

In embodiments herein, methods are described that enable an estimate of a transmitted signal vector (x) to be computed, given a received signal vector (y) and knowledge of a channel matrix (H) and statistics of noise (n). An initial solution signal vector for the estimate is calculated, and based on the initial solution signal vector, a pool of other possible solution signal vectors is generated. Methods described herein may be iterative in nature, and may cycle through possible solution signal vectors so as to continually improve the estimate of the transmitted signal vector. The methods may terminate once stopping criteria are reached, for example.

Figure 3:
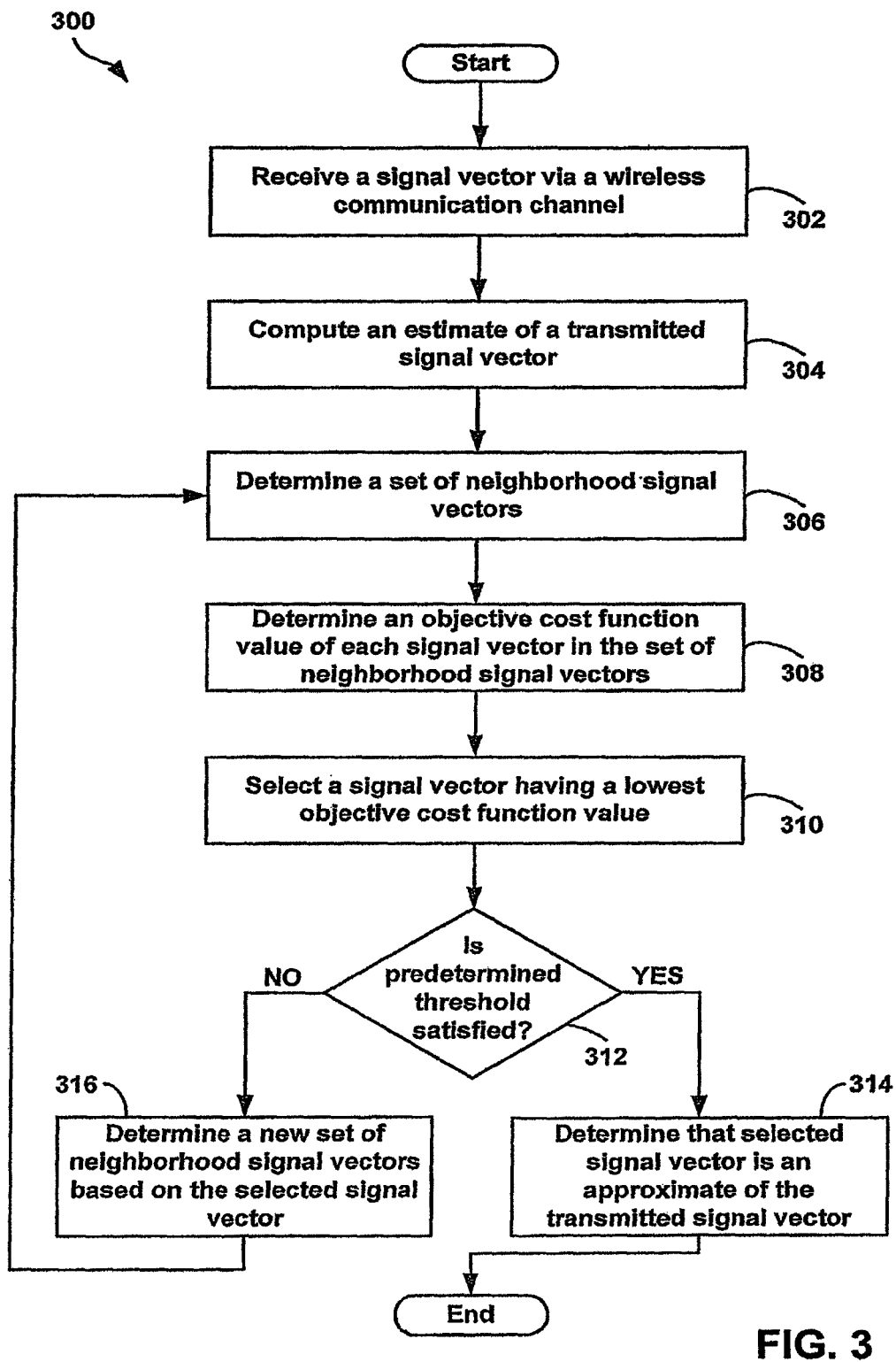
FIG. 3 shows a flowchart of an illustrative embodiment of a method for computing an estimate of a transmitted signal vector.

FIG. 3 shows a flowchart of an illustrative embodiment of a method 300 for computing an estimate of a transmitted signal vector (x), given a received signal vector (y) and knowledge of a channel matrix (H) and statistics of noise (n). It should be understood that, for this and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The method 300 may be performed to compute an estimate of a transmitted signal vector based on a received signal vector. The method 300 may be performed a number of times in an iterative fashion, and thus, in some examples, a signal vector output during an iteration of the method 300 may be considered a solution to the method 300 or more generally a solution signal vector.

Initially, at block 302, a signal vector is received via a wireless communication channel. Next, at block 304, an estimate of a transmitted signal vector is computed. The estimate of the transmitted signal vector may be considered a current solution signal vector of the method 300. For example, an estimate of the current solution signal vector may be calculated using any number of methods, such as a matched filter (MF) method, minimum mean square error (MMSE) method, or zero forcing (ZF) method, for example. Alternatively, the estimate of the current solution signal vector may be a random signal vector, for example.

Following, at block 306, a set of neighborhood signal vectors is determined. For example, the set of neighborhood signal vectors may be generated based on neighborhood criteria. Each neighborhood signal vector includes symbols that may be chosen based on Euclidean distance to the solution signal vector, and thus, example neighborhood criteria includes a distance between symbols. Thus, a set of neighborhood signal vectors may be generated such that the neighborhood signal vectors differ from the solution signal vector in only one coordinate. A number of neighborhood signal vectors generated may depend on a definition of the neighborhood, for example, and a size of the set may dictate how many iterations of the method 300 are performed.

A heuristic search algorithm may then be used to search the neighborhood signal vectors for a signal vector that minimizes an objective function. For example, the objective function may determine energy of a difference signal vector between the received signal vector (y) in the presence of noise and the signal vector (Hx) in the absence of noise. The energy may be a measure of a closeness of the received signal vector (y) to an estimated received signal vector (Hx). At block 308, an objective cost function value of each signal vector in the set of neighborhood signal vectors is determined and, at block 310, a signal vector that has a lowest objective cost function value is selected.

Next, at decision block 312, a determination is made as to whether a predetermined threshold is satisfied. The predetermined threshold may include a value of an objective cost function, and to determine if the predetermined threshold is satisfied, the value of the objective cost function for the signal vector selected at block 310 is compared to the predetermined threshold.

If a predetermined threshold is satisfied, then, at block 314, the selected signal vector is determined to be an approximate (i.e., an approximation) of the transmitted signal vector (x). For example, the method 300 may terminate once a value of the objective cost function of the selected signal vector achieved in an iteration of the method 300 is within a predetermined bound from a global minimum. In other embodiments, if a value of the objective function of the selected signal vector at block 310 is better than a value of the objective cost function of a solution signal vector obtained so far (e.g., obtain during a previous iteration of the method 300), then the selected vector at block 310 of a current iteration of the method 300 is marked as a solution for the estimate of the transmitted signal vector (x). In some embodiments, the method 300 is performed for a fixed number of iterations. However, since convergence of the method 300 may depend on the signal-to-noise (SNR) and can vary between tens of iterations to hundreds of iterations, adaptive stopping criterion may be used.

If the predetermined threshold is not satisfied, then, at block 316, a new set of neighborhood signal vectors is determined based on the selected signal vector, and the method 300 returns to block 306. The predetermined threshold may not be satisfied if the value of the objective function of the selected vector at block 310 is worse than a value of a best solution signal vector obtained so far. Thus, the method 300 may be repeated to obtain a better solution signal vector (e.g., a signal vector that has a value of the objective cost function better than a value of the objective cost function of the solution signal vector obtained so far). The method 300 may be repeated any number of iterations until the predetermined threshold criteria is satisfied, or until a maximum number of iterations have been performed, for example. In some embodiments, as discussed below, signal vectors may be marked as taboo, e.g., the signal vector was already considered, for example, to increase a rate at which a solution to the method 300 may be obtained.

Figure 4:
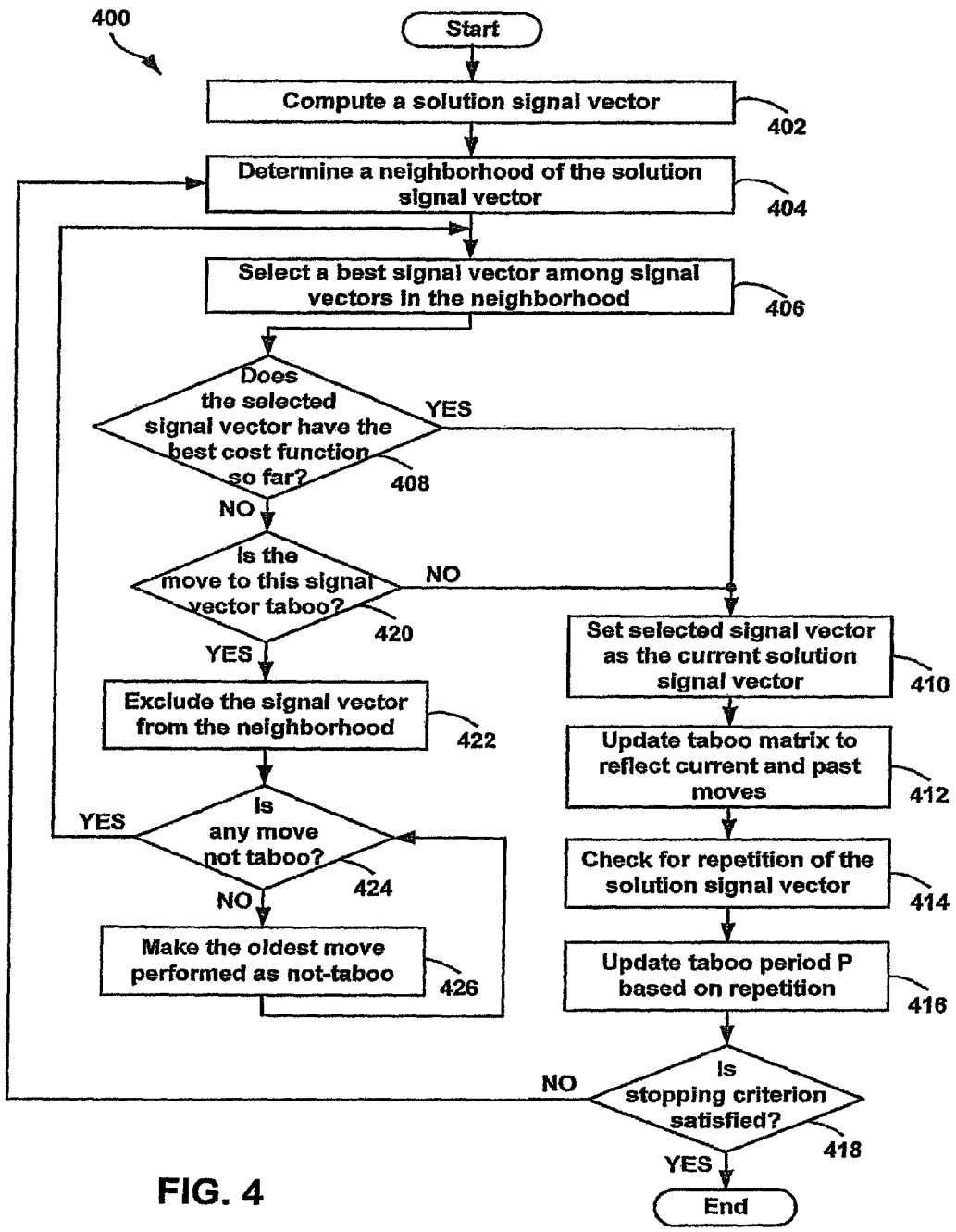
FIG. 4 shows a flowchart of another illustrative embodiment of a method for computing an estimate of a transmitted signal vector.

FIG. 4 shows a flowchart of another illustrative embodiment of a method 400 for computing an estimate of a transmitted signal vector (x), given a received signal vector (y) and knowledge of a channel matrix (H) and statistics of noise (n). The method 400 begins at block 402 where initially, a solution signal vector $x^{(0)}$ is computed. The solution signal vector may be computed in a number of ways. For example, a signal vector (y) is received and a filtering operation may be performed on the signal vector such as a matched filter (MF) operation, a zero forcing (ZF) operation, or a minimum mean square estimate (MMSE) operation by multiplying the received signal vector by a corresponding matrix filter. Specifically, a matched filter (MF) solution signal vector may be obtained by computing $x^{(0)} = H^H y$, where $H^H$ is the matched filter matrix, and each element of a resultant signal vector may be quantized to a nearest element in the modulation alphabet. As another example, using the ZF operation, a ZF solution signal vector can be obtained by computing $x^{(0)} = (H^H H)^{-1} H^H y$, where $(H^H H)^{-1} H^H$ is the ZF matrix, and each element of a resultant signal vector may be quantized to a nearest element in the modulation alphabet. As still another example, using the MMSE operation, an MMSE signal vector can be obtained by computing $$x^{(0)} = \left(H^H H + \frac{N_0}{E_s} I\right)^{-1} H^H y,$$

where $$\left(H^H H + \frac{N_0}{E_s} I\right)^{-1} H^H$$

is the MMSE matrix, and each element of a resultant signal vector may be quantized to a nearest element in the modulation alphabet. A solution signal vector could also be generated as a random signal vector including elements from the modulation alphabet, for example.

Next, at block 404, a neighborhood of the solution signal vector is determined. For example, given the solution signal vector for binary signaling, a neighborhood can be defined by inverting a sign of each coordinate of the solution signal vector. For a binary solution signal vector of (1), a neighborhood of (+1) is (−1) and a neighborhood of (−1) is (+1). The inverting operation may be performed on Nt coordinates to obtain Nt signal vectors, for example, where Nt is a number of transmitting antennas.

The neighborhood of a signal vector may be chosen based on Euclidean distance, i.e., for a given symbol, those N symbols that are nearest each symbol of the signal vector will form a neighborhood of each symbol and a nearest symbol will be a first neighbor, a next nearest symbol will be a second neighbor, and so on. Let M denote a number of members of the set of $A = \{a_1, a_2, \ldots, a_M\}$. A neighborhood set $N(a_q)$, $q \in \{1, \ldots, M\}$, can be defined as a fixed subset of $A \setminus a_q$, which is a symbol-neighborhood of $a_q$. Cardinality or number of members of the set is chosen to be the same for all $a_q$, $q=1, \ldots, M$ (i.e., $|N(a_q)| = N$, $\forall q$). Thus, maximum and minimum values of a size of the neighborhood (N) are (M−1) and 1, respectively.

As one example, for a given solution signal vector $A = \{−3, −1, 1, 3\}$ for 4-pulse amplitude modulation (4-PAM), and choosing a neighborhood (N) to be 2, then $N(−3) = \{−1, 1\}$, $N(−1) = \{−3, 1\}$, $N(1) = \{−1, 3\}$, and $N(3) = \{1, −1\}$ are possible signal vector-neighborhoods. If $w_v(a_q)$, $v=1, N$ denotes the vth element in $N(a_q)$, then $w_v(a_q)$ is the vth signal vector-neighbor of $a_q$.

A size of the neighborhood may be selected based on a modulation alphabet size M (e.g., which may be fixed for a given system). For example, a size of a neighborhood (N) may be set to be (M−1). If a value of M is large, a value of N can be taken to be less than (M−1) to reduce complexity. For instance, for 64-QAM (i.e., two 8-PAMs in quadrature where M=8), a size of the neighborhood (N) can be set to N=2 instead of N=7. Neighborhoods of signal vectors can be defined in other ways as well, such as to choose vectors for the neighborhood that differ from a given solution signal vector in multiple coordinates.

After defining a neighborhood around the solution signal vector (i.e., defining a set of neighboring signal vectors based on neighborhood criteria), a best signal vector among signal vectors in the neighborhood is selected, at block 406. In one example, a best signal vector is selected even if the best signal vector is worse, in terms of likelihood, than the solution signal vector (e.g., or than a current solution signal vector of an iteration of the method 400). A heuristic search algorithm may be used to search the neighborhood of the solution signal vector for a signal vector that minimizes an objective function. For example, when noise is Gaussian, a maximum-likelihood (ML) detection function given by:

$$\hat{x}_{ML} = \mathop{\text{argmin}}_{x \in A^{d_t}} \|y - Hx\|^2 = \mathop{\text{argmin}}_{x \in A^{d_t}} \phi(x) \quad \text{Equation (2)}$$

where $$\phi(x) \triangleq x^H H^H H x - 2\Re(y^H H x)$$

can be solved for a minimum of the function $\phi(x)$ that can be found iteratively using $x^{(0)}$ as the initial solution signal vector, which equates to a minimum of the function $\|y - Hx\|^2$. Computational complexity of Equation (2) to obtain a true ML solution is exponential in a number of transmit antennas $(d_t)$, which may be prohibitive for a large number of transmit antennas. Thus, obtaining a true ML solution signal vector by exhaustively searching over all possible vectors has a high complexity. Example embodiments herein may achieve approximate ML performance for a large $d_t$ at low complexities. For example, embodiments of methods herein may perform a non-exhaustive search by searching less than an entire possible neighborhood of signal vectors and declare a signal vector that has a least ML cost among those which are searched as a final solution signal vector. In this manner, the final solution signal vector may not be a true ML solution signal vector, but the final solution signal vector may be near to the true ML solution signal vector in terms of the ML cost, for example.

In Equation (2), x is the selected signal vector and Hx is a transformed signal vector that would be the received signal vector in the absence of noise. The function $$\phi(x) \triangleq x^H H^H H x - 2\Re(y^H H x)$$

may be considered energy of a difference signal vector between an actual received signal vector (y) in the presence of noise and the signal vector Hx in the absence of noise. This is a measure of a closeness of the received signal vector (y) to an estimated ideal received signal vector Hx. The signal vector x which gives a least value of the function $\phi(x)$ is the ML solution signal vector. The lower the value of the ML cost function $\phi(x)$, the more likely that the transmitted signal vector is the selected signal vector x.

The ML cost function may be computed for all elements in the neighborhood to obtain $NN_t$ computed values, and in one example, to select a best signal vector among vectors in the neighborhood, at block 406, a signal vector that has a best or maximum likelihood value of an objective cost function is selected. The signal vector that has the maximum likelihood value will be a signal vector nearest to the received signal vector (y) depending on noise. For example, the signal vector that has the maximum likelihood value may be one that differs from the solution signal vector in only one coordinate. The method 400 is iterative, and thus, the best signal vector selected is the best found at this point of the iterations.

Let $x^{(m)}=(x_1^{(m)} x_2^{(m)} \ldots x_{d_t}^{(m)})$ denote a signal vector belonging to a solution space in an mth iteration, where $x_i^{(m)} \in A$. A signal vector given by:

$$z^{(m)}(u,v)=[z_1^{(m)}(u,v) z_2^{(m)}(u,v) \ldots z_{d_t}^{(m)}(u,v)] \quad \text{Equation (3)}$$

is a (u, v)th signal vector-neighbor of $x^{(m)}$, u=1, ..., $d_t$, v= 1, ..., N, if $x^{(m)}$ differs from $z^{(m)}$ (u, v) in the uth coordinate only and the uth element of $z^{(m)}$(u, v) is the with signal vector-neighbor of $x_u^{(m)}$. That is, $$z_i^{(m)}(u, v) = \begin{cases} x_i^{(m)} & \text{for } i \neq u \\ w_v(x_u^{(m)}) & \text{for } i \neq u. \end{cases} \quad \text{Equation (4)}$$

There are $d_t$N signal vectors that differ from a signal vector in the solution space in only one coordinate. The $d_t$N signal vectors may form the neighborhood of the signal vector.

In one example, let $g^{(m)}$ be a signal vector that has a least ML cost found until the mth iteration of the method 400. Define $y_{MF} \triangleq H^H y$, and $R \triangleq H^H H$, and $y_{MF}$ and R are computed. Consider an mth iteration in the algorithm, m≥0, and define $f^{(m)} \triangleq Rx^{(m)} - y_{MF}$. Let $e = z^{(m)}(u, v) - x^{(m)}$. The ML costs of the $d_t$N neighbor signal vectors of $x^{(m)}$, namely, $z^{(m)}(u, v)$, u= (1, ..., $d_t$), v=(1, ..., N), are computed as follows:

$$\begin{aligned}
\phi(z^{(m)}(u,v)) &= (x^{(m)} + e)^H R(x^{(m)} + e) - 2R((x^{(m)} + e)^H y_{MF}) \\
&= \phi(x^{(m)}) + 2R(e^H R x^{(m)}) + e^H Re - 2R(e^H y_{MF}) \\
&= \phi(x^{(m)}) + 2R(e^H (Rx^{(m)} - y_{MF})) + e^H Re \\
&= \phi(x^{(m)}) + 2R(e^H f^{(m)}) + e^H Re \\
&= \phi(x^{(m)}) + \underbrace{2R(e_u^* f_u^{(m)}) + |e_u|^2 R(u, u)}_{\triangleq C(u,v)}
\end{aligned} \quad \text{Equation (5)}$$

where the last step follows since only one coordinate of e is non-zero, and R(u, u) is the (u, u)th element of R, $e_u^{(m)}(u,v)$ is the uth element of $e_u^{(m)}(u,v)$, and $f_u^{(m)}$ is the uth element of $f^{(m)}$. The function $\phi(x^{(m)})$ on the RHS in Equation (5) can, in some examples, be dropped since the function may not affect the cost minimization. The argument of $z^{(m)}(u, v)$ is a possible solution signal vector. The ML cost of the possible solution signal vector can be obtain by computing $\phi(x)(z^{(m)}(u, v))$. Alternatively, to reduce complexity of this computation, Equation (5) provides a manner to compute the same in terms of the ML cost of the previous solution signal vector x(m) plus an update term. This is an example of a computationally efficient way of incrementally computing the ML cost.

Next, at decision block 408, it is determined if the selected signal vector among the signal vectors in the neighborhood has the best cost function so far. For example, the ML value of the selected signal vector can be compared to ML values of previously selected signal vectors. For a first iteration, an initial selected signal vector will have a best ML value, and thus, that signal vector is selected as a current solution signal vector (e.g., where the current solution signal vector is considered an estimate of the transmitted signal vector). If the selected signal vector at block 406 has the best cost function so far, the selected signal vector is set as the current solution signal vector, as shown at block 410.

In defining the neighborhood of the solution signal vector in a given iteration, the method 400 attempts to avoid cycling of selecting solution signal vectors of past iterations. Thus, solution signal vectors of past iterations may be defined as taboo (i.e., prohibit selection of these signal vectors), which enables an efficient search of the neighborhood. Taboo search is a mathematical optimization method that that uses memory structures. For example, once a potential solution signal vector has been determined, the potential solution signal vector is marked as taboo so that the algorithm does not revisit that possibility repeatedly. A number of past iterations is parametrized as a taboo period (P). A search is referred to as a fixed taboo search if the taboo period remains constant. If the taboo period is dynamically changed (e.g., increases if more repetitions of the solution signal vectors are observed in the search path), then the search is referred to as a reactive taboo search (RTS).

Selecting signal vectors through iterations of the method 400 involves selecting a subsequent signal vector that varies in symbols from a previously selected signal vector, for example. A taboo value of a selection of a signal vector or a taboo move from one symbol to a neighbor symbol is defined as a number of subsequent iterations for which that move cannot be considered. A taboo matrix contains entries that denote the taboo value of all moves.

The taboo matrix may initially include all zero entries, and as the method 400 progresses through iterations, recently visited solution signal vectors may be declared as taboo. Thus, as shown at block 412, the taboo matrix is updated to reflect current and past moves. The taboo matrix is updated, for example, to indicate that the signal vector set as the current solution signal vector at block 410 is taboo for the taboo period. The taboo matrix helps to accelerate the method 400 so as not to repeat selection of a signal vector already selected, and thus, so that a signal vector is only considered as a solution one time during the taboo period, for example.

The taboo matrix T may be of size $d_t$M×N whose entries denote taboo values of moves. For each coordinate of the solution signal vector (e.g., there are $d_t$ coordinates), there are M rows in T, where each row corresponds to one symbol in the modulation alphabet A, and indices of the rows for the uth coordinate are from (u−1)M+1 to uM, u∈{1, ..., $d_t$}. The N columns of T correspond to the N symbol-neighbors of the symbol corresponding to each row. In other words, the (r, s)th entry of the taboo matrix, r=1, ..., $d_t$M, s=1, ..., N, corresponds to a move (u, v) from $x^{(m)}$ when $$u = \left[\frac{r-1}{M}\right] + 1,$$

v=s, and $x_u^{(m)} = a_q$, where q=mod(r−1,M)+1. Entries of the taboo matrix, which are non-negative integers, are updated in each iteration of the method 400 and are used to decide a direction in which the search proceeds.

Next, at block 414, a check is made for repetition of the solution signal vector and, in block 416, a taboo period (P) is updated based on the repetition. The taboo period (P) may be set to an initial value, for example, to a value of 2, such that for two subsequent iterations of the method 400, a solution signal vector may be excluded. The taboo period can be updated to suit a search space. For example, the taboo period may be decreased when a number of iterations have been executed and no repetition of selected signal vectors has occurred, or alternatively, the taboo period may be increased when a number of iterations have been executed and repetition of selected signal vectors has occurred. A solution signal vector may be selected again after the taboo period expires. If the same solution signal vector is repeated, for example, after five iterations of the method 400, then the taboo period may be increased to 6, 7, and so forth, until no repetitions of the solution signal vector are encountered so that new solution signal vector may be encountered to search new areas of the search space. Alternatively, if the solution signal vector is not encountered again, the taboo period may be decreased (e.g., if the taboo period is at 7, the taboo period can be decreased to 6, 5, . . . , 0) to search more efficiently. Thus, if the method 400 is executed for a given number of iterations, and no solution signal vectors are repeated, then the taboo period (P) may be decreased. The taboo period may be increased or decreased by any value, for example.

An average length (in number of iterations of the method 400) between two successive occurrences of a solution signal vector (e.g., repetitions) may be $I_{rep}$. If a move is marked as taboo in an iteration of the method 400, the move will remain as taboo for P subsequent iterations unless the move results in a better solution signal vector. Thus, a taboo period, P, is a dynamic non-negative integer parameter. Initially, $I_{rep}=0$, $P=P_0$, and all entries of the taboo matrix are set to zero. As the method 400 progresses through iterations, the values of these variables are updated.

Thus, after a move is performed, the new solution signal vector obtained is checked for repetition at block 414, and the taboo period P is updated based on the repetition at block 416. For a linear vector channel model, repetition can be checked by comparing values of ML cost functions of solution signal vectors in previous iterations with a value of the ML cost function of the current solution signal vector. If there is a repetition (e.g., same value), a length of the repetition from a previous occurrence is found, the average length, $I_{rep}$, is updated, and the taboo period P is modified as $P=(P+1)$. If a number of iterations of the method 400 elapsed since a last change of the value of P exceeds $\beta 1_{rep}$, for a fixed $\beta>0$, the taboo period may be set $P=\max(1, P-1)$. A minimum value of P may be established as one. After a move (u', v') is accepted, if a value of the ML cost function of the current signal vector is less than the value of the ML cost function of the best solution signal vector so far (e.g., $\phi(x^{(m+1)})<\phi(g^{(m)})$), the current signal vector is now a current solution signal vector, and the taboo period is updated as follows:

$$T((u'-1)M+q',v')=T((u'-1)M+q'',v'')=0 \quad \text{Equation (6)}$$

and $g^{(m+1)}=x^{(m+1)}$; Equation (7)

else $$T((u'-1)M+q',v')=T((u'-1)M+q'',v'')=P+1 \quad \text{Equation (8)}$$

$$1\text{flag}=1, g^{(m+1)}=g^{(m)} \quad \text{Equation (9)}$$

where 1 flag is a binary flag used to indicate whether the method 400 has reached a local minima in a given iteration. The flag may be used in the evaluation of stopping criterion at decision block 418 of the method 400.

In addition, entries of the taboo matrix are updated as follows:

$$T(r,s)=\max\{T(r,s)-1,0\} \quad \text{Equation (10)}$$

for $r=1, \ldots, d_tM$, $s=1, \ldots, N$, and update $f^{(m)}$ as $$f^{(m+1)}=f^{(m)}+(z_{u'}^{(m)}(u'v')-x_{u'}^{m})Ru' \quad \text{Equation (11)}$$

where Ru' is the u' th column of R.

Following, at decision block 418, if stopping criterion is satisfied (described more fully below), then the current solution signal vector is identified as an estimate of the transmitted signal vector. If the stopping criterion is not satisfied, the method 400 returns to block 404, and a new neighborhood of the best solution signal vector found so far is determined. Following, at block 406, a best signal vector among signal vectors in the new neighborhood is selected, as described above, and it is determined if the selected signal vector has the best value of the cost function so far (e.g., an ML cost function value of the best signal vector is calculated and compared with the ML cost function value of previous solution signal vectors) at decision block 408. If the new ML cost function value is lower than ML cost function values of previous solution signal vectors, then the new selected best signal vector may still be rejected as a possible solution signal vector. For example, at decision block 420, a check is made to determine if a move to this signal vector is taboo. If the move to this signal vector is not taboo, then, at block 410, the new best signal vector is set as the current solution signal vector, and the method 400 continues through blocks 412-418. This allows the algorithm to escape from local minima. The process is continued through blocks 412-418.

An operation on $x^{(m)}$ which gives $x^{(m+1)}$ belonging to the signal vector-neighborhood of $x^{(m)}$ is referred to as a move. The method 400 executes a move (u, v) if $x_{(m+1)}=z^{(m)}(u, v)$. A number of candidates to be considered for a move in any one iteration is $d_tN$. Also, an overall number of distinct moves possible is $d_tMN$, which is the cardinality of the union of all moves from all. $M^{d_t}$ possible solution signal vectors. A taboo value of a move, which is a non-negative integer, indicates that a move cannot be considered for that many subsequent iterations of the method 400, unless certain conditions are satisfied.

Let:

$$(u_1, v_1) = \underset{u,v}{\text{argmin}}\, C(u, v) \quad \text{Equation (12)}$$

The move $(u_1, v_1)$ is accepted if the value of the ML cost function of the move is less than the value of the ML cost function of a previous move, or if the move to the signal vector is not taboo. Thus, a move is accepted if any one of the following two conditions is satisfied:

$$\phi(z^{(m)}(u_1,v_1))<\phi(g^{(m)}) \quad \text{Equation (13)}$$

$$T((u_1-1)M+q,v_1)=0 \quad \text{Equation (14)}$$

where T is the taboo matrix and q is such that $a_q=x_{u_1}^{(m)}$, $a_q \in A$.

If the move $(u_1, v_1)$ is accepted, then make:

$$x^{(m+1)}=x^{(m)}+e^{(m)}(u_1,v_1)$$

If the move to the signal vector is taboo, for example, the move is indicated in the taboo matrix as taboo, and then, at block 422, the signal vector is excluded from the neighborhood. Thus, for example, the excluded signal vector will not be selected again during the taboo period (P). Following, at decision block 424, a check is made to determine if any move is not taboo, and, if any move is not taboo, then, at block 406, a next best signal vector among signal vectors in the current neighborhood is selected. However, if all moves are taboo, an oldest move performed as not taboo is made, at block 426, and when it is determined if any move is not taboo at decision block 424, a move will be found as not taboo. The method 400 begins again at block 406 to select a new best signal vector among signal vectors in the neighborhood of the current solution signal vector.

If move $(u_1, v_1)$ is not accepted (i.e., neither of the conditions in Equations (13) and (14) is satisfied), value of $(u_2, v_2)$ are determined such that $$(u_2, v_2) = \underset{u,v:u \neq u_1, v \neq v_1}{\operatorname{argmin}} C(u, v) \qquad \text{Equation (15)}$$

and acceptance of the $(u_2, v_2)$ move is verified. If this move also cannot be accepted, the procedure is repeated for $(u_3, v_3)$, and so on. If all the $d_rN$ moves are taboo, then all the taboo matrix entries are decremented by a minimum value in the taboo matrix. This continues until one of the moves becomes acceptable. Let $(u', v')$ be the index of the neighbor signal vector with the minimum cost value for which the move is permitted. Make $$x^{(m+1)} = z^{(m)}(u', v') \qquad \text{Equation (16)}$$

The variables q', q", v" are implicitly defined by $a_{q'} = x_{u'}^{(m)} = w_{v'}(x_{u'}^{m+1})$ and $a_{q''} = x_{u'}^{(m+1)}$ where $a_{q'}, a_{q''} \in A$.

The method 400 will end once stopping criteria are satisfied, as shown at decision block 418. For example, the method 400 may end once a maximum number of iterations are performed so that there is a set time limit, and at the end of the time limit, the best solution signal vector found so far is chosen as the solution.

A quality of the solution signal vectors may improve quickly for a certain number of iterations of the method 400, and then a rate of identifying a better solution signal vector may decrease. Thus, the method 400 may reach a point at which a current solution signal vector is acceptable, and thus, the method 400 will be determined to have settled. In addition, the method 400 may terminate when a number of repetitions of solutions reaches a predetermined maximum number.

Convergence of the method 400 depends on the signal-to-noise ration (SNR) and can vary between tens of iterations to hundreds of iterations. For example, convergence of the method 400 may be slow at low SNRs, and convergence of the method 400 may be fast at moderate to high SNRs. Thus, as an alternative to fixing a number of iterations at which to stop the method 400, stopping criterion that makes use of knowledge of a best value of the ML cost function found until a current iteration of the method 400 can be used. Since the ML criterion is to minimize $\|Hx-y\|^2$, a minimum value of an objective function $\phi(x)$ is greater than $-y^H y$. The method 400 may be stopped when the value of the ML cost function achieved in an iteration of the method 400 is within a certain range of a global minimum, which is $-y^H y$. Thus, the method 400 may be stopped in an mth iteration if 1-flag=1 and the condition:

$$\frac{|\phi(g^{(m)}) - (-y^H y)|}{|-y^H y|} < \alpha_1 \qquad \text{Equation (17)}$$

is satisfied, and alternatively, with at least a minimum number of iterations being completed to ensure that the search algorithm has settled. A bound may be gradually relaxed as a number of iterations increases and the method 400 can be terminated when:

$$\frac{|\phi(g^{(m)}) - (-y^H y)|}{|-y^H y|} < m\alpha_1 \qquad \text{Equation (18)}$$

In Equations (17) and (18), $\alpha_1$ and $\alpha_2$ are positive constants.

In one example, the constants $\alpha_1$ and $\alpha_2$ may be preset values. In another example, $\alpha_1$ and $\alpha_2$ may be calculated using the method 400 in FIG. 4 without using the stopping criteria. For instance, for a given realization of x, H and n, the method 400 may be performed a number of iterations (e.g., a large number of about 1000) without using the stopping criterion at a high SNR (e.g., an SNR at which $10^{-4}$ BER is achieved). At the end of the number of iterations, the following ratio can be calculated:

$$\delta_{max1} = \frac{|\phi(g^{(max1)}) - (-y^T y)|}{|-y^T y|} \qquad \text{Equation (19)}$$

The value of $\delta_{max1}$ can be obtained for several realizations, and an average of $\delta_{max1}$ can be calculated over several realizations and used as the value of $\alpha_1$, for example. Next, for a given realization of x, H and n, the method 400 of FIG. 4 can be performed at a lower SNR (e.g., an SNR at which $10^{-2}$ BER is achieved) for a number of iterations (e.g., about 1000 iterations) without using the stopping criterion. At the end of the number of iterations, the following ratio can be calculated:

$$\delta_{max2} = \frac{|\phi(g^{(max2)}) - (-y^T y)|}{|-y^T y|} \qquad \text{Equation (20)}$$

In addition, an iteration index m' (e.g., a number of iterations) after which a best solution vector remains the same until the method 400 is terminated at the number of iterations can be determined. A ratio of $$\frac{\delta_{max2}}{m'}$$

can be calculated and obtained for several realizations. An average of $$\frac{\delta_{max2}}{m'}$$

over the several realizations can be used as the value of $\alpha_2$, for example.

Thus, using Equations (17)-(18), a fraction of a cost function of signal vectors selected to a length of signal vector y is compared to a threshold. In Equations (17)-(18), a difference between a value of a global minimum cost function and a value of the cost function of the current solution signal vector is determined, and if the difference is less than a threshold (e.g., $\alpha_1$ or $m\alpha_2$), the method 400 ends. A combination of stopping criterion including determining functions of Equations (17)-(18) and/or based on a maximum number of iterations may be used.

To determine an estimate of the transmitted signal vector as fast as possible, it may be desired to end the method 400 as early as possible, for example. Alternatively, for more stringent performance requirements, the method 400 may be performed until a global best solution signal vector is obtained. In one example, in a 4-QAM system, a number of minimum iterations of the method 400 may be set to 20, a number of maximum iterations may be set to 300, a number of maximum repetitions may be set to 75, $\alpha_1 = 0.05$, and $\alpha_2 = 0.0005$.

In example embodiments, the method 400 adapts to different levels of SNR and increases convergence where possible. For example, when SNR is high, power in a noise vector is low, and thus, a value of the true ML solution signal vector is close to $(-y^H y)$. Thus, if $g(m)$ is close to the true ML solution, then $\phi(x)(g(m))$ will be close to $(-y^H y)$. At high SNRs, near or exact ML solution values may be achieved in few iterations of the method 400, and hence Equation (17) will be satisfied for selected $\alpha_1$. The method 400 will determine a quality of the solution signal vector and can exit when appropriate. At low SNRs, Equation (17) may not be satisfied (for given $\alpha_1$) because of high noise power. Thus, constraints can be slowly relaxed as a number of elapsed iterations of the method 400 increases resulting in use of Equation (18). Thus, after a given number of iterations, for example 10-20 iterations, Equation (18) may replace Equation (17) and be used as the stopping criteria.

Using the method 400, a definition of a neighborhood is not static for all iterations, but rather, certain signal vectors are prohibited from being included in the neighbor list (e.g., by implementing repetition checks/taboo period). In addition, the method 400 does not end once a local minima is found, but rather, enables for the possibility of finding a better solution signal vector due to the escape strategy of allowing to move to the best neighbor signal vector even if that neighbor signal vector has a lesser likelihood than a current solution signal vector.

Figure 5:
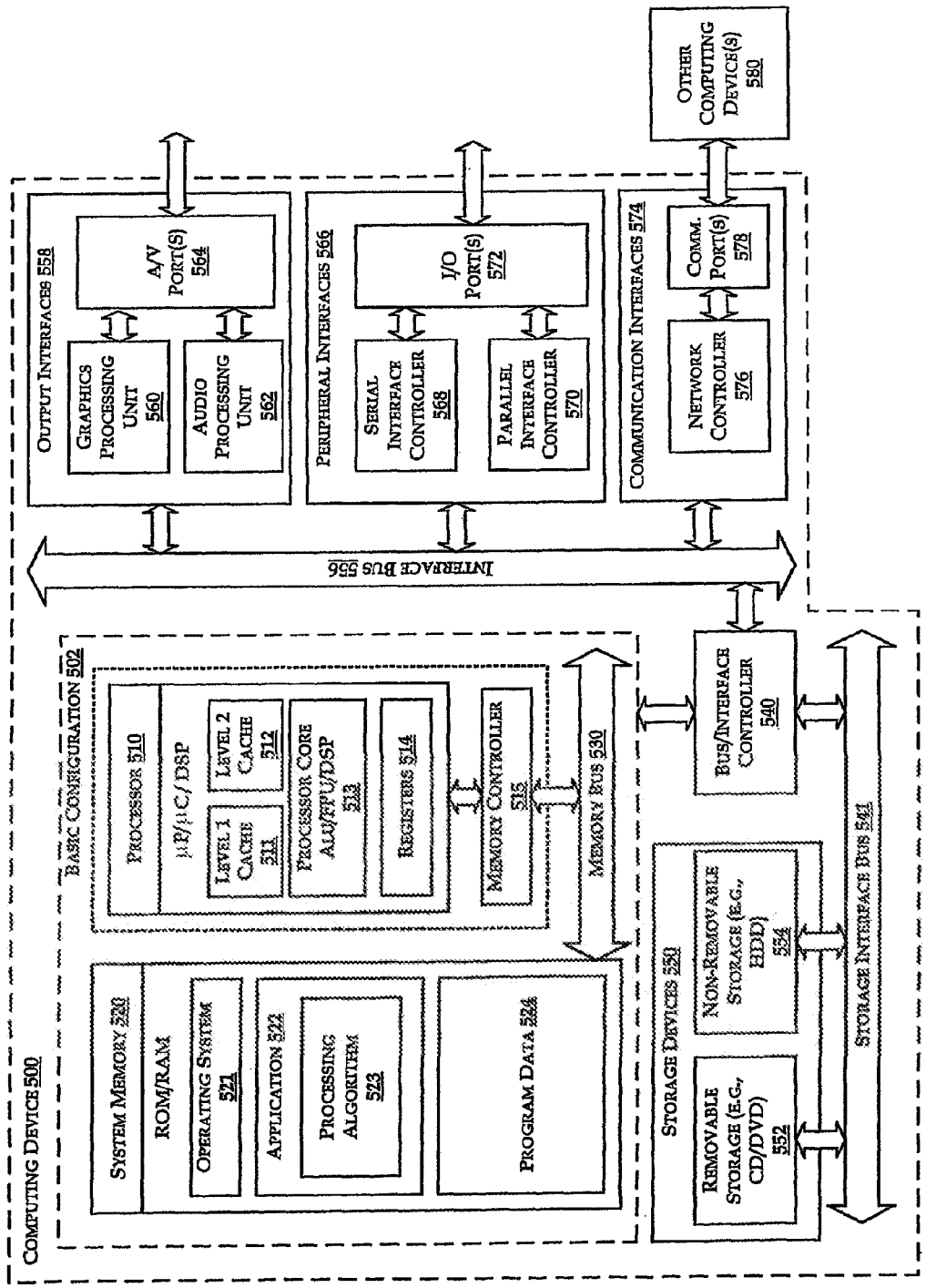
FIG. 5 shows a block diagram of an illustrative embodiment of a computing device arranged to execute the methods shown in FIG. 3 or 4.

FIG. 5 shows a block diagram of an illustrative embodiment of a computing device 500 arranged for to execute the methods shown in FIG. 3 or 4, for example. In a very basic configuration 502, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 includes algorithms 523 that may be arranged to perform functions shown in FIGS. 3 and/or FIG. 4. Program Data 524 includes data corresponding to the received signals, for example. In some example embodiments, application 522 can be arranged to operate with program data 524 on the operating system 521. This described basic configuration is illustrated in FIG. 5 by those components within dashed line 502.

Computing device 500 can have additional features or functionality, and additional interfaces to facilitate communications between the basic configuration 502 and any required devices and interfaces. For example, a bus/interface controller 540 can be used to facilitate communications between the basic configuration 502 and one or more data storage devices 550 via a storage interface bus 541. The data storage devices 550 can be removable storage devices 552, non-removable storage devices 554, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 552 and non-removable storage 554 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 556 for facilitating communication from various interface devices (e.g., output interfaces, peripheral interfaces, and communication interfaces) to the basic configuration 502 via the bus/interface controller 540. Example output interfaces 558 include a graphics processing unit 560 and an audio processing unit 562, which can be configured to communicate to various external devices such as a display or speakers via one or more A/V ports 564. Example peripheral interfaces 566 include a serial interface controller 568 or a parallel interface controller 570, which can be configured to communicate with external devices such as input devices (e.g., keyboard, mouse, pen, voice input device, touch input device, etc.) or other peripheral devices (e.g., printer, scanner, etc.) via one or more I/O ports 572. An example communication interface 574 includes a network controller 576, which can be arranged to facilitate communications with one or more other computing devices 580 over a network communication via one or more communication ports 578. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

Examples and Simulations:

In an example embodiment, the method 300 may be applied in a V-BLAST MIMO system. For example, in a V-BLAST MIMO system with $N_t$ transmit and Nr receive antennas, consider a received signal vector model, in which $x \in A^{Nt}$ is a transmitted signal vector, where A is a modulation alphabet; $H \in C^{Nr \times Nt}$ is a channel gain matrix whose entries are modeled as CN(0,1); $y \in C^{Nr}$, is a received signal vector; and $n \in C^{Nr}$ is a noise signal vector whose entries are modeled as independent identically distributed (i.i.d)

$$CN\left(0, \sigma^2 = \frac{N_t E_s}{\gamma}\right),$$

where Es is an average energy of transmitted symbols and γ is an average received SNR per receive antenna. The complex system model can be rewritten as a real-valued system as:

$$\tilde{y} = \tilde{H}\tilde{x} + \tilde{n} \qquad \text{Equation (21)}$$

where $$\tilde{H} = \begin{bmatrix} R(H) & -\Im(H) \\ \Im(H) & R(H) \end{bmatrix}, \tilde{y} = \begin{bmatrix} R(y) \\ \Im(y) \end{bmatrix}, \tilde{x} = \begin{bmatrix} R(x) \\ \Im(x) \end{bmatrix}, \tilde{n} = \begin{bmatrix} R(n) \\ \Im(n) \end{bmatrix}.$$

Applying the method 300 or method 400 on the real-valued system model in Equation (21), an estimate of the transmitted signal vector can be obtained. Note that the transmit and receive dimensions in the linear vector channel in Equation (21) are $d_t = 2N_t$ and $d_r = 2N_r$.

Uncoded bit error ratio (BER) performance of RTS based detection (e.g., use of methods 300 or 400) of V-BLAST signals can be evaluated through simulations. The following RTS parameters were used in simulations for 4-QAM: MMSE initial vector, $P_0=2$, $\beta=0.1$, $\alpha_1=5\%$, $\alpha_2=0.05\%$, maximum repetitions=75, and minimum iterations=20. Perfect channel state information at the receiver (CSIR) and i.i.d. fading were assumed.

Figure 6:
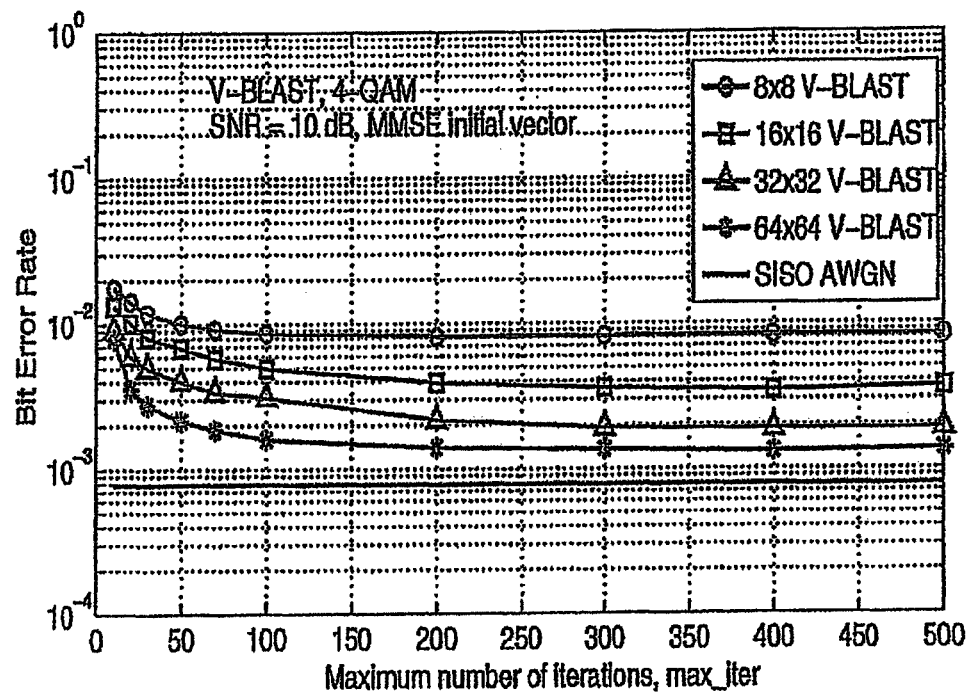
FIG. 6 shows an example plot that illustrates bit error rate (BER) performance of example methods described herein.

FIG. 6 illustrates an example plot of the BER performance of the RTS algorithm as a function of maximum number of iterations, max_iter, in 8×8, 16×16, 32×32, and 64×64 V-BLAST systems with 4-QAM at an average SNR of 10 dB. For the system parameters considered, the BER converges (i.e., change in BER between successive iterations becomes small) for a maximum number of iterations of the methods 300 or 400 greater than about 300 iterations, and the converged BER of RTS exhibits large-dimension behavior (i.e., converged BER improves with increasing $N_t = N_r$). For example, the converged BER improves from about 8.3×10$^{-3}$ for 8×8 V-BLAST to about 13×10$^{-3}$ for 64×64 V-BLAST. This improvement is compared to the BER in SISO AWGN channel that is 7.8×10$^{-4}$ for 4-QAM.

Figure 7:
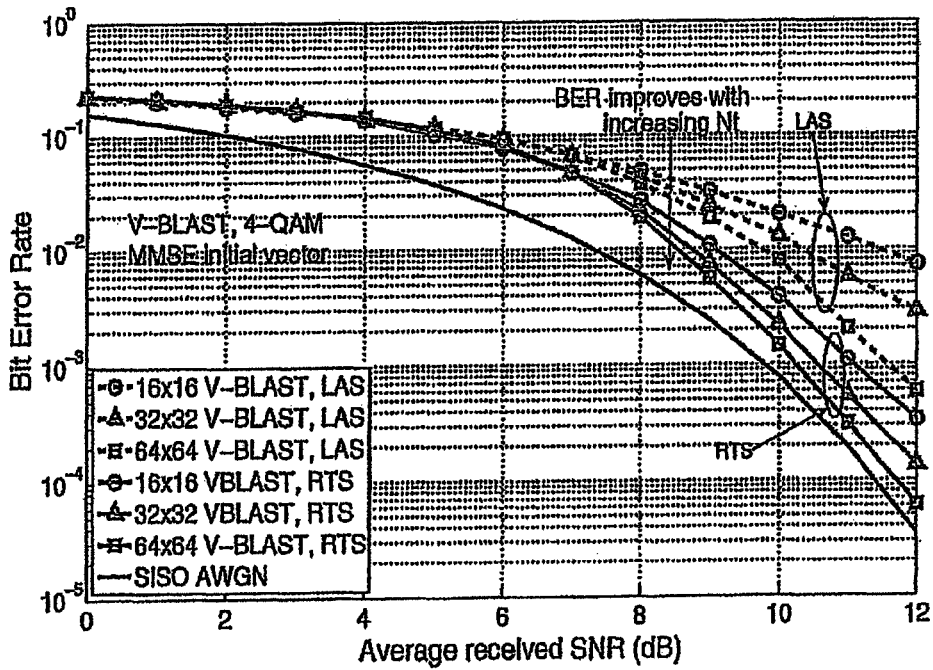
FIG. 7 shows an example plot that illustrates BER performance of example methods described herein compared with that of the likelihood ascent search (LAS) algorithm.

FIG. 7 is an example plot of the BER performance of the RTS algorithm compared with that of the likelihood ascent search (LAS) algorithm. FIG. 7 shows the BER performance of RTS and LAS algorithms for 16×16, 32×32 and 64×64 V-BLAST with 4-QAM. It can be seen that for the number of dimensions (i.e., $N_t$) considered, LAS requires 128 real dimensions (i.e., 64×64 V-BLAST with 4-QAM) to achieve performance close to within about 1.8 dB of SISO AWGN performance at 10$^{-3}$ BER, whereas RTS achieves better closeness to SISO AWGN performance with 32 real dimensions (i.e., 16×16 V-BLAST with 4-QAM). Also, in 64×64 V-BLAST, RTS achieves 10$^{-3}$ BER at an SNR of about 0.4 dB away from SISO AWGN performance. RTS can achieve this performance due in part to the escape strategy in RTS that allows the method to move out of local minimas and move toward better solutions.

Figure 8:
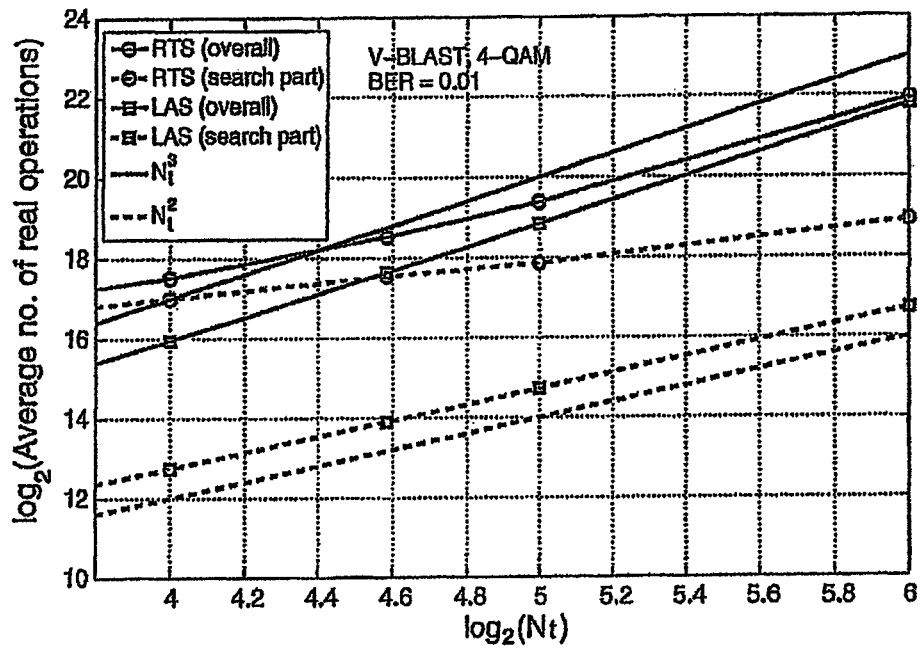
FIG. 8 shows an example plot that illustrates complexity of example methods described herein compared to the LAS algorithm.

Next, the complexity of the RTS algorithm for detection in V-BLAST is shown. The total complexity comprises of three main components, namely, i) computation of the initial solution signal vector $\tilde{x}^{(0)}$ ii) computation of $\hat{H}^T\hat{H}$, and iii) the reactive taboo search operation. The MMSE initial solution signal vector can be computed in O($N^2_t N_r$) complexity, i.e., in O($N_t N_r$) per-symbol complexity since there are $N_t$ symbols per channel use. Likewise, computation of $\hat{H}^T\hat{H}$ can be done in O($N_t Nr$) per-symbol complexity. Note that since computation of $\tilde{x}^{(0)}$ and $\hat{H}^T\hat{H}$ are needed in both RTS and LAS, the complexity components of computing initial solution signal vector $\tilde{x}^{(0)}$ and $\hat{H}^T\hat{H}$ will be same for both these algorithms. Also, while the complexity components to compute $\tilde{x}^{(0)}$ and $\hat{H}^T\hat{H}$ are deterministic, the component of computing the reactive taboo search operation, is random, and thus, an average complexity can be obtained through simulations. FIG. 8 is a plot that illustrates complexity of the computation for the search part alone as well as overall complexity plots of the RTS and LAS algorithms for V-BLAST with $N_t=N_r$ and 4-QAM at a BER of 10$^{-2}$. From FIG. 8, it can be observed that the RTS search part has a higher complexity than the LAS search part, however, it can be seen that since the overall complexity is dominated by the computation of $\hat{H}^T\hat{H}$ and $\tilde{x}^{(0)}$, and the difference in overall complexity between RTS and LAS is not high.

Figure 9:
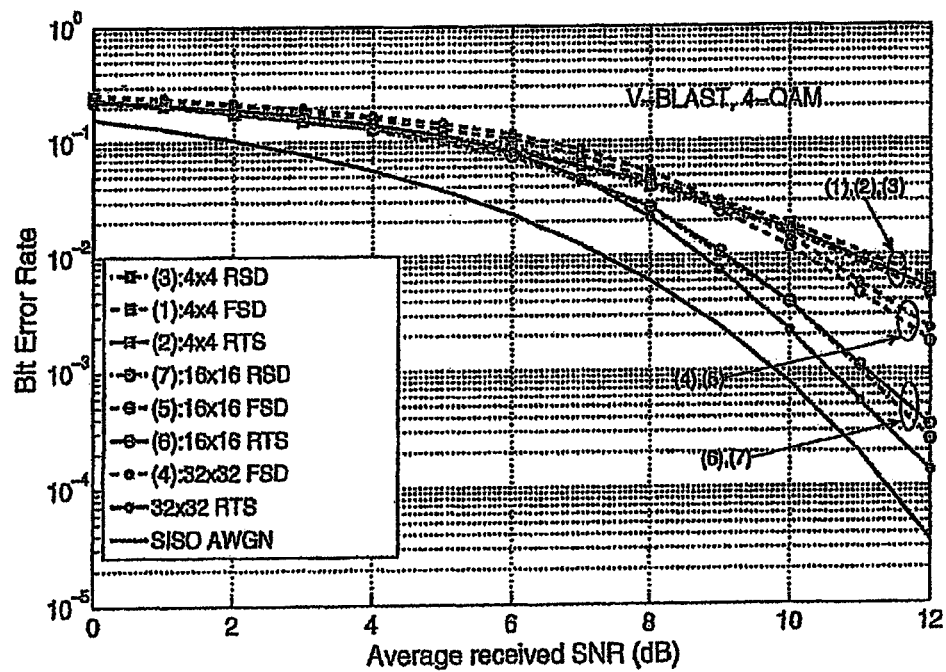
FIG. 9 shows an example plot that illustrates an uncoded BER comparison of example methods described herein with a fixed-complexity sphere decoder (FSD) for V-BLAST.

FIG. 9 is a plot that illustrates an uncoded BER comparison of the RTS detector with a fixed-complexity sphere decoder (FSD) for V-BLAST with $N_t=N_r=4$, 8, 16, 32 and 4-QAM. The performance of the reduced-complexity sphere decoder (RSD) is also plotted for $N_t=N_r=4$, 8, 16. Comparing the performances of FSD, RSD and RTS in FIG. 9, since the complexity of FSD is forced to be constant, performance of FSD is compromised at low/medium SNRs compared to that of RSD (e.g., see plots for $N_t=N_r=16$, where RSD performs better than FSD by about 1 dB at 10$^{-2}$ BER). Performance of RTS is close to that of RSD (see plots of RSD and RTS for $N_t=N_r=16$). RTS achieves such good performance in large dimensions at a lesser complexity compared to that of RSD (see complexity comparison in Table 1 for 16×16 V-BLAST). For a large number of antennas (e.g., $N_t=N_r=32$), RSD complexity becomes prohibitively high. However, the FSD and RTS performances for 32×32 V-BLAST are shown. It is seen that RTS performs better than FSD (by about 1.5 dB at 10$^{-2}$ BER) due to the suboptimum nature of FSD that arises because of fixing its complexity, and due to large-dimension behavior advantage of RTS. In addition, RTS achieves better performance than FSD at a lesser complexity compared to that of FSD.

TABLE 1

| Detector | Per-Symbol-complexity (PSC) in number or real operations and SNR to achieve 10$^{-2}$ uncoded BER for 4-QAM (Ref: FIG. 4) | | | | | | | |
|---|---|---|---|---|---|---|---|---|
| | 4 × 4 | | 8 × 8 | | 16 × 16 | | 32 × 32 | |
| Method | PSC | SNR | PCS | SNR | PSC | SNR | PSC | SNR |
| RTS | 5,540 | 10.9 dB | 9,469 | 9.7 dB | 11,730 | 9 dB | 21,320 | 8.8 dB |
| FSD | 355 | 11 dB | 1,621 | 10.1 dB | 8,445 | 10.1 dB | 155,253 | 10.3 dB |
| RSD | 662 | 10.8 dB | 2,881 | 9.7 dB | 64,217 | 9 dB | — | — |

Table 1 shows complexity and performance comparison of the RTS algorithm with the FSD algorithm and the RSD algorithm in 4×4, 8×8, 16×16 and 32×32 V-BLAST with 4-QAM. RTS outperforms FSD in terms of complexity and performance for large dimensions (e.g., 32×32). For large M and large $N_t$, complexity of FSD becomes prohibitively high.

Figure 10:
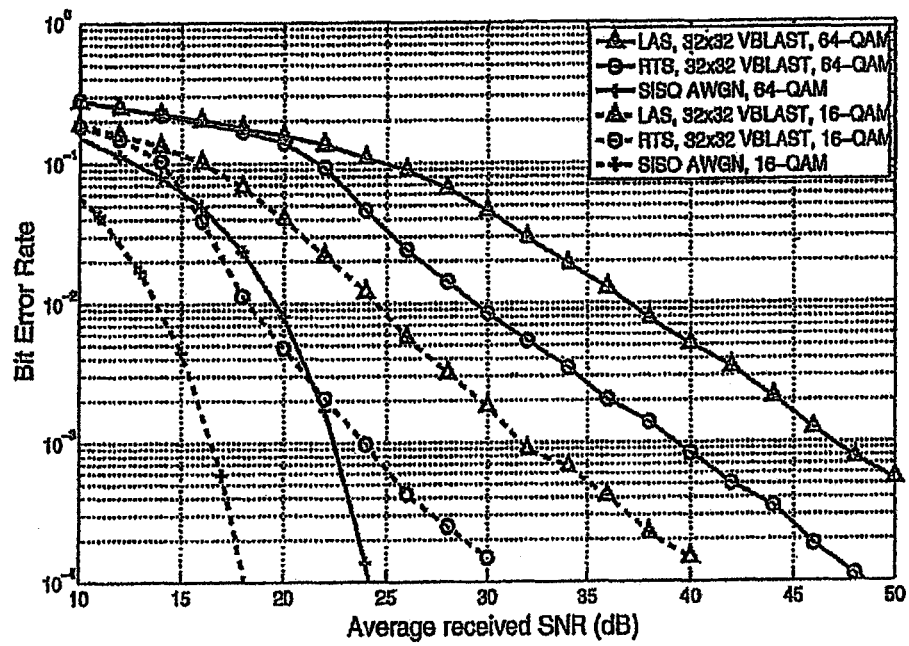
FIG. 10 shows an example plot of performance of example methods described herein for higher-order QAM in a 32×32 V-BLAST system.

FIG. 10 illustrates a plot of the performance of RTS for higher-order QAM in a 32×32 V-BLAST system (16-QAM and 64-QAM at spectral efficiencies of 128 bps/Hz and 192 bps/Hz). The following RTS parameters are used in the simulations: MMSE initial vector, $P_0=2$, $\beta=0.01$; (N=3, $\alpha_1=0.3\%$, $\alpha_2=0.001\%$, maximum repetition=250, minimum iteration=30, maximum iteration=1000) for 16-QAM, and (N=2, $\alpha_1=0005\%$, $a_2=0.00005\%$, maximum repetition=1000, minimum iteration=50, maximum iteration=3000) for 64-QAM. The plots in FIG. 10 show that RTS performs better than LAS by about 6 dB at $10^{-2}$ BER for 16-QAM and 64-QAM.

Figure 11:
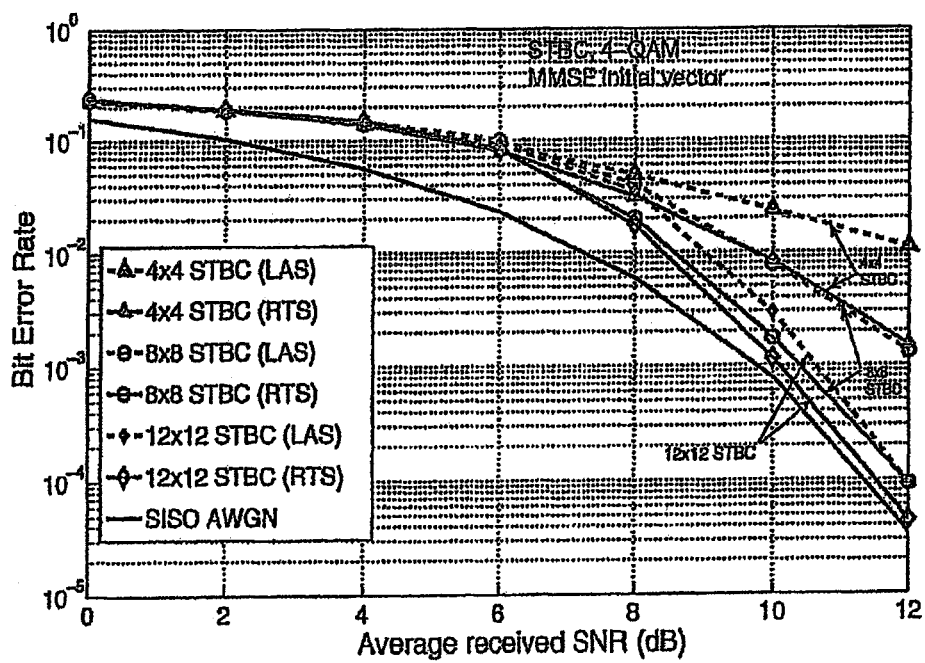
FIG. 11 shows an example plot that illustrates uncoded BER of example methods described herein as a function of average received SNR in decoding 4×4 (32 dimensions), 8×8 (128 dimensions) and 12×12 (288 dimensions) non-orthogonal STBCs from cyclic division algebra (CDA) for 4-QAM and $N_t = N_r$.

In FIG. 11, an example plot is shown that includes the uncoded BER of the RTS algorithm as a function of average received SNR in decoding 4×4 (32 dimensions), 8×8 (128 dimensions) and 12×12 (288 dimensions) non-orthogonal STBCs from cyclic division algebra (CDA) for 4-QAM and $N_t=N_r$. Perfect CSIR and i.i.d fading are assumed. For the same settings, performance of the LAS algorithm is also plotted for comparison. MMSE initial signal vector is used in both RTS and LAS. As a lower bound on performance, the BER performance on a SISO AWGN channel is plotted as well. The following parameters were used in the simulations for 4-QAM: MMSE initial vector, $P_0=2$, $\beta=1$, $\alpha_1=5\%$, $\alpha_2=0.05\%$, maximum repetitions=75, minimum iterations=20, and maximum iterations=300. From FIG. 11, it can be observed that the BER of RTS improves and approaches SISO AWGN performance as $N_t=N_r$ (i.e., STBC size) is increased. For example, with 12×12 STBC having 288 dimensions, RTS decoding is able to achieve close to within about 0.4 dB from SISO AWGN performance at $10^{-3}$ uncoded BER. Also, as in the case of V-BLAST, RTS is found to perform better than LAS in decoding non-orthogonal STBCs as well.

Figure 12:
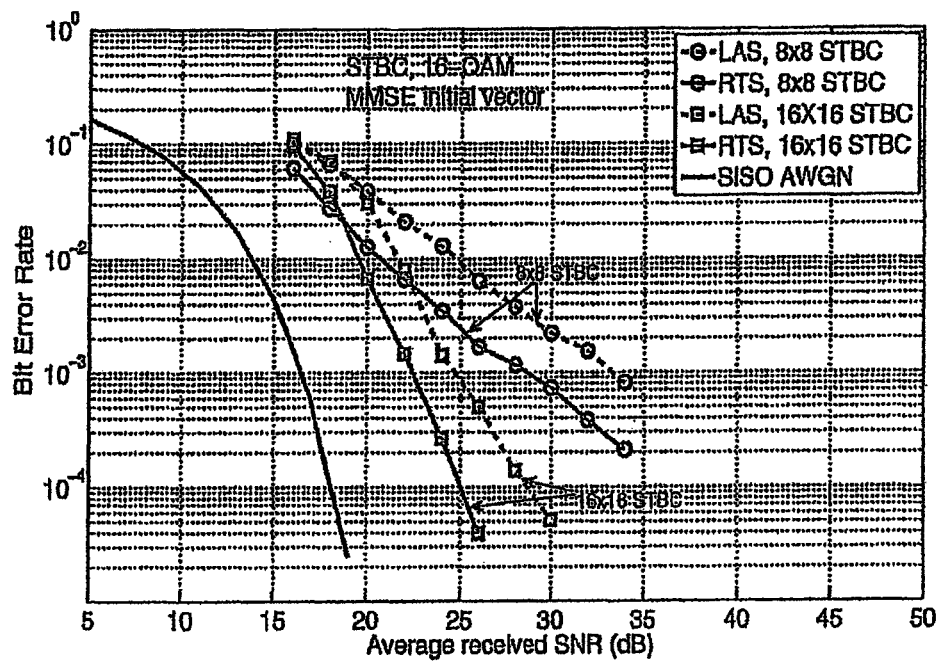
FIG. 12 shows an example plot that illustrates uncoded BER of example methods described herein as a function of average received SNR in decoding 8×8 and 16×16 non-orthogonal STBCs from cyclic division algebra (CDA) for 4-QAM and $N_t = N_r$.

In the case of 16-QAM, RTS performs better than LAS as can be seen in FIG. 12, where the following parameters were used in the simulations: MMSE initial vector, $P_0=2$, $\beta=1$, N=3, $\alpha_1=01\%$, $\alpha_2=0.002\%$, maximum repetitions=75, minimum iterations=30, and maximum iterations=800.

Figure 13:
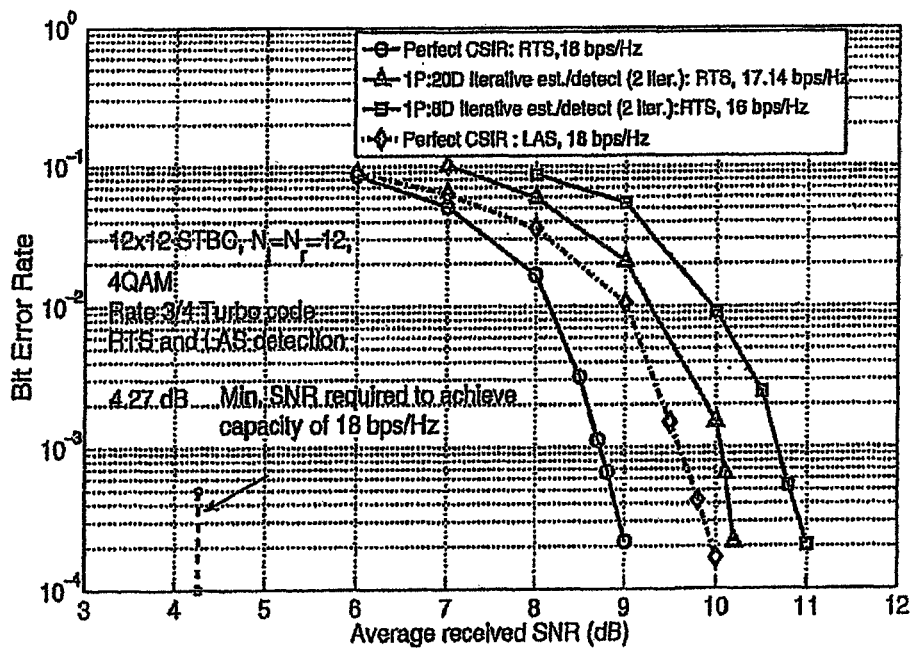
FIG. 13 shows an example plot that illustrates rate-¾ turbo coded BER performance of example methods described herein of 12×12 non-orthogonal STBC from CDA with $N_t = N_r$ and 4-QAM under perfect CSIR and i.i.d fading.

FIG. 13 is an example plot that shows the rate-¾ turbo coded BER performance of RTS decoding of 12×12 non-orthogonal STBC from CDA with $N_t=N_r$ and 4-QAM (corresponding to a spectral efficiency of 18 bps/Hz), under perfect CSIR and i.i.d fading. A theoretical minimum SNR required to achieve about 18 bps/Hz spectral efficiency on a $N_t=N_r=12$ MIMO channel with perfect CSIR and i.i.d fading is about 4.27 dB (obtained through simulation of the ergodic MIMO capacity formula). From FIG. 13, it can be seen that RTS decoding is able to achieve vertical fall in coded BER close to within about 5 dB from the theoretical minimum SNR, which is a good nearness to capacity performance. Also, the performance of RTS is about 1 dB better than that of LAS at $2 \times 10^{-4}$ coded BER for the same system settings.

The RTS algorithm may be used in other communication schemes where large dimensions are created in time due to the high frequency selective nature of a channel, i.e., large number (tens to hundreds) of multipath components (MPC), as can typically occur in UWB channels. For example, in a frequency-selective MIMO channel with $N_t$ transmit and Nr receive antennas, let L denote the number of MPCs. Data is transmitted in frames, and each frame has K data symbols preceded by a cyclic prefix (CP) of length L symbols, K≥L.

While CP avoids inter-frame interference, there may be intersymbol interference (ISI) within the frame. Let $x_q \in A^{N_t}$ be the transmitted symbol at time q, $0 \leq q \leq K-1$, where A is the transmit symbol alphabet, which is taken to be M-QAM. The received signal vector at time q can be written as:

$$Y_q = \sum_{l=0}^{L-1} H_l X_{q-l} + w_q, \quad q = 0, \ldots, K-1 \qquad \text{Equation (22)}$$

where $y_q \in CN^{r \times 1}$, $H_l C^{Nr \times Nt}$ is the channel gain matrix for the lth MPC. The entries of $H_l$ are assumed to be random with distribution CN(0, 1). It is further assumed that $H_l$, $l=0, \ldots, L-1$ do not change for one frame duration. $w_q$ $CN^{r \times 1}$ is the additive white Gaussian noise vector at time q, whose entries are independent, each with variance $N_0$. The CP will render the linearly convolving channel to a circularly convolving one, and so the channel will be multiplicative in frequency domain. Because of the CP, the received signal in frequency domain, for the ith frequency index ($0 \leq i \leq K-1$), can be written as:

$$r_i = G_i u_i + v_i \qquad \text{Equation (23)}$$

where $$r_i = \frac{1}{\sqrt{K}} \sum_{q=0}^{K-1} e^{\frac{-2\pi jqi}{K}} y_q, \; j = \sqrt{-1}, \; u_i = \frac{1}{\sqrt{K}} \sum_{q=0}^{K-1} e^{\frac{-2\pi jqi}{K}} x_q,$$

$$v_i = \frac{1}{\sqrt{K}} \sum_{q=0}^{K-1} e^{\frac{-2\pi jqi}{K}} w_q, \text{ and } G_i = \sum_{l=0}^{L-1} e^{\frac{-2\pi jli}{K}} H_l.$$

Stacking the K vectors $r_i$, I=0, …, K−1, then:

$$r = \underbrace{GF}_{\triangleq Heff} x_{eff} + v_{eff} \qquad \text{Equation (24)}$$

where:

$$r = \begin{bmatrix} r_0 \\ r_1 \\ \vdots \\ r_{K-1} \end{bmatrix}, \; G = \begin{bmatrix} G_0 & & 0 \\ & G_1 & \ddots \\ 0 & & G_{K-1} \end{bmatrix},$$

$$x_{eff} = \begin{bmatrix} x_0 \\ x_1 \\ \vdots \\ x_{K-1} \end{bmatrix}, \; v_{eff} = \begin{bmatrix} v_0 \\ v_1 \\ \vdots \\ v_{K-1} \end{bmatrix},$$

$$F = \frac{1}{\sqrt{K}} \begin{bmatrix} \rho 0, 0^I N_t & \rho 1, 0^I N_t & \cdots & \rho K-1, 0^I N_t \\ \rho 0, 1^I N_t & \rho 1, 2^I N_t & \cdots & \rho K-1, 1^I N_t \\ \vdots & \vdots & \cdots & \vdots \\ \rho 0, K-1^I N_t & \rho 1, K-1^I N_t & \cdots & \rho K-1, K-1^I N_t \end{bmatrix}$$

$$= \frac{1}{\sqrt{K}} D_K \otimes IN_t,$$

where $$\rho_{q,l} = e^{\frac{-2\pi jqi}{K}},$$

$D_K$ is the K-point DFT matrix and $\otimes$ denotes the Kronecker product. The received signal model in Equation (24) can be rewritten in real form with $d_t=2N_tK$ and $d_r=2N_rK$.

A detected symbol vector obtained using frequency domain (FD) MMSE equalization can be used as the initial signal vector to the RTS algorithm for this real-valued system model. The FD-MMSE equalizer on the ith frequency employs MMSE nulling as:

$$\hat{u}_i = \left(G_i^H G_i + \frac{No}{Es} I_{Nt}\right)^{-1} G_i^H r_i, \; 0 \leq i \leq K-1 \quad \text{Equation (25)}$$

where $E_s$ is the average energy of a transmitted symbol. The $\hat{u}_i$'s are transformed back to time domain using K-point IDFT to obtain an estimate of the transmitted symbol vector as:

$$\hat{x}_q = \frac{1}{\sqrt{K}} \sum_{i=0}^{K-1} e^{\frac{2\pi j q i}{K}} \hat{u}_i, \; 0 \leq q \leq K-1 \quad \text{Equation (26)}$$

which are used to form the initial vector to the RTS algorithm.

The BER performance of the RTS equalizer was simulated in a 4×4 MIMO V-BLAST system with 4-QAM as a function of average $E_b/N_0$ per receive antenna. Uniform power delay profile is assumed (i.e., all the L paths are assumed to be of equal energy). The performance for a various number of delay paths, L, and frame sizes, K, keeping L/K constant is evaluated. It is noted that the system becomes a 'large-dimension system' when L and K are increased keeping L/K fixed. The FD-MMSE equalizer output is used as the initial vector for both RTS and LAS. The following RTS parameters are used: $P_0=2$; $\beta=1$; $\alpha_1=0.03$; maximum repetition=75; minimum iterations=30. For K=64 and 128, maximum iteration=300 and $\alpha_2=0.00075$. For K=512, maximum iteration=500 and $\alpha_2=0.0004$.

Figure 14:
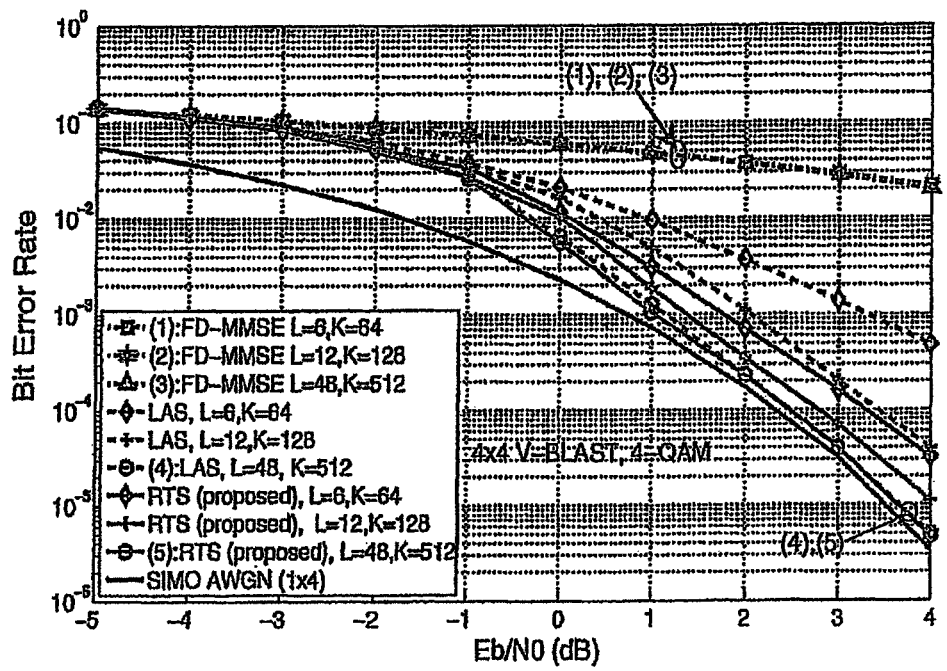
FIG. 14 shows an example plot that illustrates uncoded BER of example methods described herein.

FIG. 14 is an example plot of uncoded BER of the RTS equalizer for (L=6, K=64), (L=12, K=128), and (L=48, K=512), L/K=0.09375. Note that for (L=48, K=512), the number of transmit dimensions is $d_t=2N_tK=2\times4\times512=4096$ dimensions. In addition to the performance of RTS, the performance of i) the FD-MMSE equalizer (without any subsequent search), ii) LAS equalizer, and iii) single-input multiple-output (SIMO) AWGN with Nr=4 is shown. It can be seen that subsequent search operations performed in RTS and LAS result in improved performance for increasing L, K. Both RTS and LAS show large-dimension behavior in this system (i.e., BER improves for increasing L, K, keeping L/K fixed). For a given L, RTS performs better than LAS. For example, at $10^{-3}$ BER, RTS performs better by about 1.5 dB and 0.8 dB compared LAS for (L=6, K=64) and (L=12, K=128).

Figure 15:
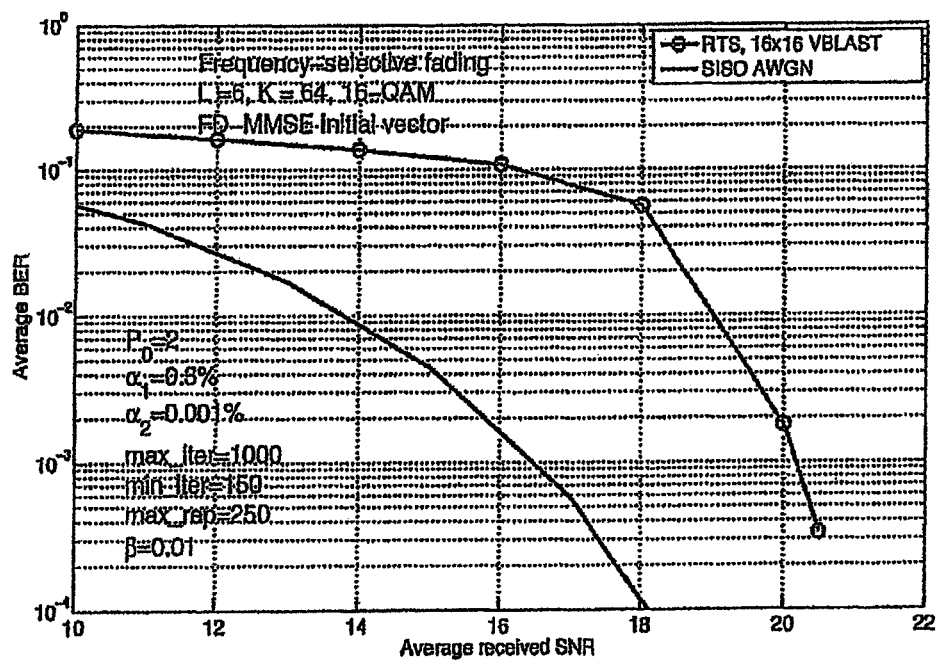
FIG. 15 shows an example plot that illustrates performance of example methods described herein in a 16×16 large-MIMO system using V-BLAST on frequency-selective fading channels.

In FIG. 15, a graph is illustrated that shows the performance of RTS in a 16×16 large-MIMO system using V-BLAST on frequency-selective fading channels (e.g., channels of a type defined in WiFi and WiMAX/LTE-A standards) for 16-QAM, L=6 and K=64. The performance of RTS observed in FIG. 15 illustrates suitability of RTS for use in practical large-MIMO wireless systems characterized by frequency-selective fading channels.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of determining an approximation of a signal vector, comprising:
    receiving a first signal vector via a wireless communication channel, the first signal vector being related to the signal vector;
    estimating the signal vector;
    determining a set of neighborhood signal vectors that include symbols selected based on a distance from symbols related to a solution signal vector for the estimate;
    determining objective cost function values for signal vectors in the determined set of neighborhood signal vectors using the first signal vector; and
    selecting a second signal vector, from the determined set of neighborhood signal vectors, having a lowest objective cost function value of the determined objective cost function values to be the approximation of the signal vector.

2. The method of claim 1, wherein the selecting of the second signal vector comprises:
    determining that the second signal vector satisfies a predetermined condition; and
    selecting the second signal vector as the approximation of the signal vector, based on the determining that the second signal vector satisfies the predetermined condition.

3. The method of claim 2, further comprising, if the second signal vector does not satisfy the predetermined condition:
    performing a fixed number of iterations using a new set of neighborhood signal vectors for each iteration that are determined based on a previously selected second signal vector; and
    determining that a given resulting selected second signal vector is the approximation of the signal vector.

4. The method of claim 2, further comprising:
    determining whether the second signal vector satisfies the predetermined condition by determining whether a ratio of (i) a difference between the objective cost function value of the second signal vector and a global minimum of the objective cost function value and (ii) the global minimum of the objective cost function value is less than a predetermined value.

5. The method of claim 4, further comprising, if the second signal vector does not satisfy the predetermined condition:
    performing a number of iterations using a new set of neighborhood signal vectors for each iteration until a given selected second signal vector satisfies the predetermined condition, the new set of neighborhood signal vectors are determined based on a previously selected second signal vector; and
    increasing the predetermined value, after performing a fixed number of iterations.

6. The method of claim 2, further comprising, if the second signal vector does not meet the predetermined condition:
    (1) determining a new set of neighborhood signal vectors based on the second signal vector;
    (2) selecting a new second signal vector in the new set of neighborhood signal vectors having a lowest objective cost function value;
    (3) determining whether the new selected second signal vector satisfies the predetermined condition; and
    (4) repeating (1)-(3) until the new selected second signal vector satisfies the predetermined condition.

7. The method of claim 1, wherein the first signal vector is a derivation of the signal vector.

8. The method of claim 1, wherein the first signal vector is a function of the signal vector.

9. A non-transitory computer readable medium having stored therein computer-executable instructions that, if executed by a computing device, cause the computing device to perform operations of approximating a signal vector comprising:
    receiving a first signal vector via a wireless communication channel, the first signal vector being related to the signal vector;
    estimating the signal vector;
    determining a set of neighborhood signal vectors that include symbols selected based on distance from symbols related to a solution signal vector for the estimate;
    determining objective cost function values for signal vectors in the set of neighborhood signal vectors using the first signal vector; and
    from the set of neighborhood signal vectors, selecting a second signal vector having a lowest objective cost function value of the determined objective cost function values to approximate the signal vector.

10. The non-transitory computer readable storage medium of claim 9, wherein the selecting of the second signal vector comprises:
    determining that the second signal vector satisfies a predetermined condition; and
    selecting the second signal vector to approximate the signal vector, based on the determining that the second signal vector satisfies the predetermined condition.

11. The non-transitory computer readable storage medium of claim 10, wherein if executed by a computing device, the computer-executable instructions cause the computing device to perform operations further comprising, if the second signal vector does not satisfy the predetermined condition:
  performing a fixed number of iterations using a new set of neighborhood signal vectors for each iteration that are determined based on a previously selected second signal vector; and
  determining that a given resulting selected second signal vector approximates the signal vector.

12. The non-transitory computer readable storage medium of claim 10, wherein if executed by a computing device, the computer-executable instructions cause the computing device to perform operations further comprising:
  determining whether the second signal vector satisfies the predetermined condition by determining whether a ratio of (i) a difference between the objective cost function value of the second signal vector and a global minimum of the objective cost function value and (ii) the global minimum of the objective cost function value is less than a predetermined value.

13. The non-transitory computer readable storage medium of claim 12, wherein if executed by a computing device, the computer-executable instructions cause the computing device to perform operations further comprising, if the second signal vector does not satisfy the predetermined condition:
  performing a number of iterations using a new set of neighborhood signal vectors for each iteration until a given selected second signal vector satisfies the predetermined condition, the new set of neighborhood signal vectors are determined based on a previously selected second signal vector; and
  after performing a fixed number of iterations, increasing the predetermined value.

14. The non-transitory computer readable storage medium of claim 10, wherein if executed by a computing device, the computer-executable instructions cause the computing device to perform operations further comprising, if the second signal vector does not meet the predetermined condition:
  (1) determining a new set of neighborhood signal vectors based on the second signal vector;
  (2) selecting a new second signal vector in the new set of neighborhood signal vectors having a lowest objective cost function value;
  (3) determining whether the new selected second signal vector satisfies the predetermined condition; and
  (4) repeating (1)-(3) until the new selected second signal vector satisfies the predetermined condition.

15. The non-transitory computer readable storage medium of claim 9, wherein the first signal vector is a derivation of the signal vector.

16. The non-transitory computer readable storage medium of claim 9, wherein the first signal vector is a function of the signal vector.

17. A receiver configured to approximate a signal vector, comprising:
  an antenna configured to receive an input signal vector via a wireless communication channel, the input signal vector being related to the signal vector;
  a memory configured to store executable instructions; and
  a processor configured to, by executing the executable instructions:
    estimate the signal vector;
    determine a set of neighborhood signal vectors that include symbols selected based on a distance from symbols in the estimated signal vector;
    determine objective cost function values for signal vectors in the determined set of neighborhood signal vectors using the input vector; and
    determine, from the determined set of neighborhood signal vectors, an approximating signal vector having a lowest objective cost function value to approximate the signal vector.

18. The receiver of claim 17, wherein the determining the approximating signal vector having the lowest objective cost function value includes determining that the approximating signal vector satisfies a predetermined condition, and determining the approximating signal vector to approximate the signal vector based on determining that the approximating signal vector satisfies the predetermined condition.

19. The receiver of claim 18, wherein the processor is further configured, if the approximating signal vector does not satisfy the predetermined condition, to
  perform a fixed number of iterations using a new set of signal vectors for each iteration that are determined based on a previously determined approximating signal vector; and
  determine a given resulting approximating signal vector to approximate the signal vector.

20. The receiver of claim 18, wherein the determining the approximating signal vector having the lowest objective cost function value includes determining whether the approximating signal vector satisfies the predetermined condition by determining whether a ratio of (i) a difference between the objective cost function value of the approximating signal vector and a global minimum of the objective cost function value and (ii) the global minimum of the objective cost function value is less than a predetermined value.

21. The receiver of claim 20, wherein the processor is further configured, if the approximating signal vector does not satisfy the predetermined condition, to:
  perform a number of iterations using a new set of signal vectors for each iteration until a given approximating signal vector satisfies the predetermined condition, the new set of signal vectors being determined based on a previously determined approximating signal vector; and
  after performing a fixed number of iterations, increase the predetermined value.

22. The receiver of claim 18, wherein the processor is further configured, if the approximating signal vector does not meet the predetermined condition, to:
  (1) determine a new approximating signal vector in a new set of signal vectors having a lowest objective cost function value;
  (2) determine whether the new approximating signal vector satisfies the predetermined condition; and
  (3) repeat (1)-(2) until the new approximating signal vector satisfies the predetermined condition.

23. The receiver of claim 17, wherein the input signal vector is a derivation of the signal vector.

24. The receiver of claim 17, wherein the input signal vector is a function of the signal vector.

* * * * *

UNITED STATES PATENT AND TRADEMARK OFFICE
CERTIFICATE OF CORRECTION

PATENT NO. : 8,804,858 B2
APPLICATION NO. : 13/933775
DATED : August 12, 2014
INVENTOR(S) : Chockalingam et al.

It is certified that error appears in the above-identified patent and that said Letters Patent is hereby corrected as shown below:

In the Specification

In Column 7, Line 37, delete "Nt" and insert -- $N_t$ --, therefor.

In Column 7, Line 38, delete "Nt signal vectors, for example, where Nt" and insert -- $N_t$ signal vectors, for example, where $N_t$ --, therefor.

In Column 9, Line 12, delete "with" and insert -- vth --, therefor.

In Column 12, Line 4, delete "fax" and insert -- far --, therefor.

In Column 12, Line 24, delete "if $x_{(m+1)}=z^{(m)}(u, v)$." and insert -- if $x^{(m+1)}=z^{(m)}(u, v)$. --, therefor.

In Column 13, Lines 34-35, delete "signal-to-noise ration" and insert -- signal-to-noise ratio --, therefor.

In Column 13, Line 62, in Equation (18), delete " $\dfrac{|\phi(g^{(m)}) - (-y^H y)|}{|-y^H y|} < m\alpha_1$ " and insert -- $\dfrac{|\phi(g^{(m)}) - (-y^H y)|}{|-y^H y|} < m\alpha_2$ --, therefor.

In Column 17, Line 1, delete "Nr" and insert -- $N_r$ --, therefor.

In Column 18, Line 15, delete "$O(N_tNr)$" and insert -- $O(N_t N_r)$ --, therefor.

Signed and Sealed this
Eighteenth Day of August, 2015

Michelle K. Lee
*Director of the United States Patent and Trademark Office*

CERTIFICATE OF CORRECTION (continued)
U.S. Pat. No. 8,804,858 B2

In Column 20, Line 34, delete "vectors ri, I=0,...," and insert -- vectors ri, i=0,..., --, therefor.

In Column 21, Line 43, delete "Nr=4" and insert -- $N_r=4$ --, therefor.